(12) United States Patent
Yao et al.

(10) Patent No.: US 7,768,746 B2
(45) Date of Patent: Aug. 3, 2010

(54) ROTATIONAL MICRO-ACTUATOR WITH A ROTATABLE PLATE, HEAD GIMBAL ASSEMBLY AND DISK DRIVE DEVICE WITH THE SAME

(75) Inventors: MingGao Yao, DongGuan (CN); Yiru Xie, DongGuan (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 1244 days.

(21) Appl. No.: 11/319,577

(22) Filed: Dec. 29, 2005

(65) Prior Publication Data
US 2007/0153428 A1    Jul. 5, 2007

(51) Int. Cl.
*G11B 5/56* (2006.01)
(52) U.S. Cl. .................................................. 360/294.4
(58) Field of Classification Search ........................ None
See application file for complete search history.

(56) References Cited

U.S. PATENT DOCUMENTS

| | | | |
|---|---|---|---|
| 5,299,081 | A | 3/1994 | Hatch et al. |
| 5,611,707 | A | 3/1997 | Meynier |
| 5,636,089 | A * | 6/1997 | Jurgenson et al. ........ 360/245.1 |
| 5,898,544 | A | 4/1999 | Krinke et al. |
| 6,198,606 | B1 | 3/2001 | Boutaghou et al. |
| 6,320,730 | B1 * | 11/2001 | Stefansky et al. ........ 360/294.4 |
| 6,538,836 | B1 | 3/2003 | Dunfield et al. |
| 6,617,763 | B2 | 9/2003 | Mita et al. |
| 6,624,984 | B2 | 9/2003 | Lewis et al. |
| 6,671,131 | B2 | 12/2003 | Kasajima et al. |
| 6,700,727 | B1 | 3/2004 | Crane et al. |
| 6,700,749 | B2 | 3/2004 | Shiraishi et al. |
| 6,760,196 | B1 | 7/2004 | Niu et al. .................. 360/294.6 |
| 6,950,266 | B1 | 9/2005 | McCaslin et al. |
| 6,950,288 | B2 * | 9/2005 | Yao et al. .................. 360/294.4 |
| 7,375,930 | B2 * | 5/2008 | Yang et al. ................ 360/294.4 |
| 7,538,984 | B2 * | 5/2009 | Yao ........................... 360/294.4 |
| 2003/0147177 | A1 | 8/2003 | Yao et al. |

(Continued)

FOREIGN PATENT DOCUMENTS

CN    1357880    7/2002

(Continued)

OTHER PUBLICATIONS

U.S. Appl. No. 11/238,998, filed Sep. 2005, Yang et al.

(Continued)

*Primary Examiner*—David D Davis
(74) *Attorney, Agent, or Firm*—Nixon & Vanderhye P.C.

(57) ABSTRACT

A head gimbal assembly includes a micro-actuator, a slider, and a suspension that supports the micro-actuator and the slider. The micro-actuator includes a metal frame including a top support to support the slider, a bottom support to connect to the suspension, and a pair of side arms that interconnect the top support and the bottom support. The top support includes a rotatable plate and connection arms that couple the rotatable plate to respective side arms. A PZT element is mounted to each of the side arms. Each PZT element is excitable to cause selective movement of the side arms. The suspension includes a load beam having a dimple that engages and supports the rotatable plate in use.

30 Claims, 16 Drawing Sheets

U.S. PATENT DOCUMENTS

| | | | |
|---|---|---|---|
| 2003/0147181 A1* | 8/2003 | Shiraishi et al. | 360/294.4 |
| 2003/0168935 A1 | 9/2003 | Ogawa et al. | |
| 2004/0070887 A1* | 4/2004 | Yao et al. | 360/294.4 |
| 2004/0085679 A1* | 5/2004 | Yao et al. | 360/294.4 |
| 2006/0023338 A1 | 2/2006 | Sharma et al. | |
| 2006/0050442 A1* | 3/2006 | Yao et al. | 360/294.4 |
| 2006/0072247 A1 | 4/2006 | Yao et al. | |
| 2006/0082917 A1 | 4/2006 | Yao et al. | |
| 2006/0098347 A1* | 5/2006 | Yao et al. | 360/294.4 |
| 2006/0146449 A1* | 7/2006 | Yao et al. | 360/294.4 |
| 2007/0076327 A1* | 4/2007 | Yang et al. | 360/294.4 |
| 2007/0139825 A1* | 6/2007 | Yao et al. | 360/294.4 |

FOREIGN PATENT DOCUMENTS

| | | |
|---|---|---|
| CN | 1455927 | 11/2003 |
| JP | 2002-74871 | 3/2002 |
| JP | 2002-133803 | 5/2002 |

OTHER PUBLICATIONS

U.S. Appl. No. 11/169,019, filed Jun. 2005, Yao et al.
U.S. Appl. No. 11/080,659, filed Mar. 2005, Yao et al.
U.S. Appl. No. 11/050,823, filed Jan. 2005, Yao et al.
U.S. Appl. No. 11/080,657, filed Mar. 2005, Zhu et al.
U.S. Appl. No. 11/235,549, filed Sep. 2005, Yao et al.
U.S. Appl. No. 11/304,623, filed Dec. 2005, Yao et al.
U.S. Appl. No. 11/169,003, filed Jun. 2005, Yao et al.
U.S. Appl. No. 11/125,248, filed May 2005, Yao et al.
U.S. Appl. No. 11/263,998, filed Nov. 2005, Yao.
U.S. Appl. No. 11/265,385, filed Nov. 2005, Yao et al.
U.S. Appl. No. 11/192,121, filed Jul. 2005, Yao et al.
U.S. Appl. No. 11/304,544, filed Dec. 2005, Yao.
U.S. Appl. No. 11/300,339, filed Dec. 2005, Yao et al.
U.S. Appl. No. 11/385,704, filed Mar. 2006, Yao et al.
U.S. Appl. No. 11/385,698, filed Mar. 2006, Yao et al.
U.S. Appl. No. 11/353,018, filed Feb. 2006, Yao.
U.S. Appl. No. 11/273,075, filed Nov. 2005, Yao.
U.S. Appl. No. 11/319,580, filed Dec. 2005, Yao et al.
U.S. Appl. No. 11/384,404, filed Mar. 2006, Yao.
U.S. Appl. No. 11/414,546, filed May 2006, Yao et al.
U.S. Appl. No. 11/440,354, filed May 2006, Li.

* cited by examiner

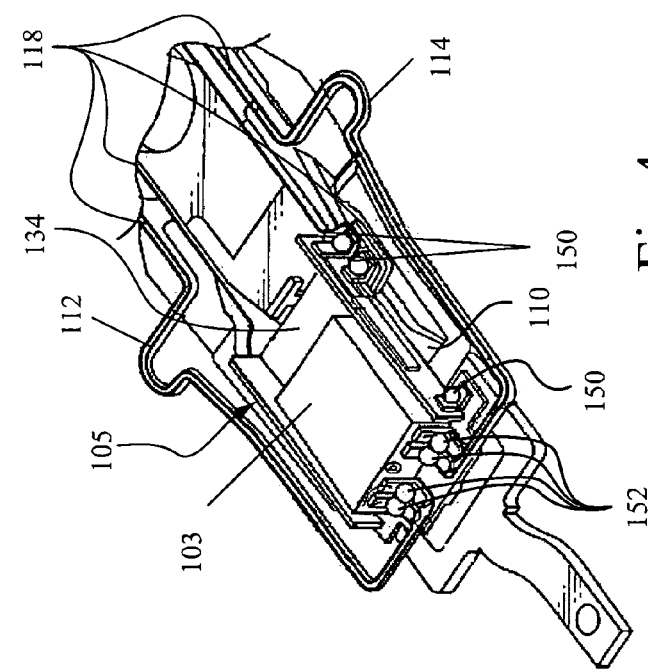
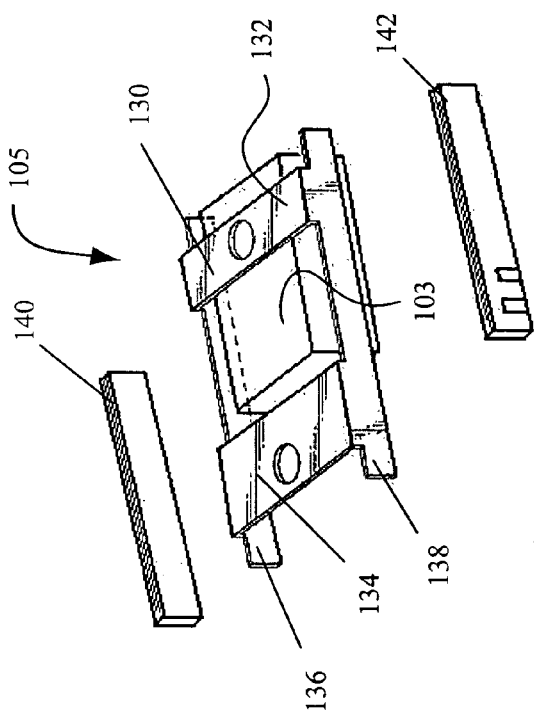
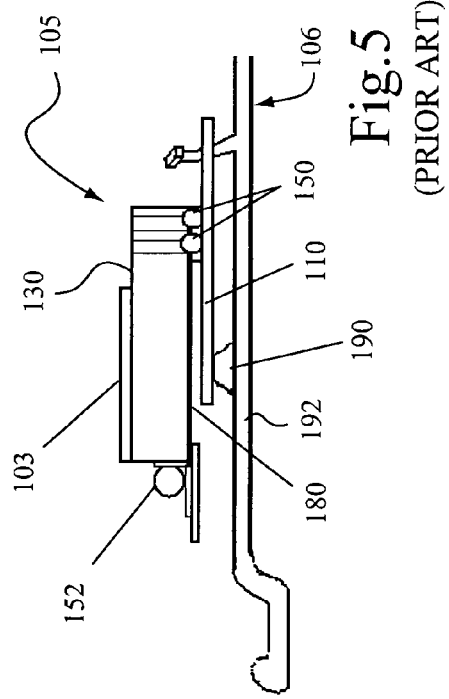
Fig.4 (PRIOR ART)
Fig.3 (PRIOR ART)
Fig.5 (PRIOR ART)

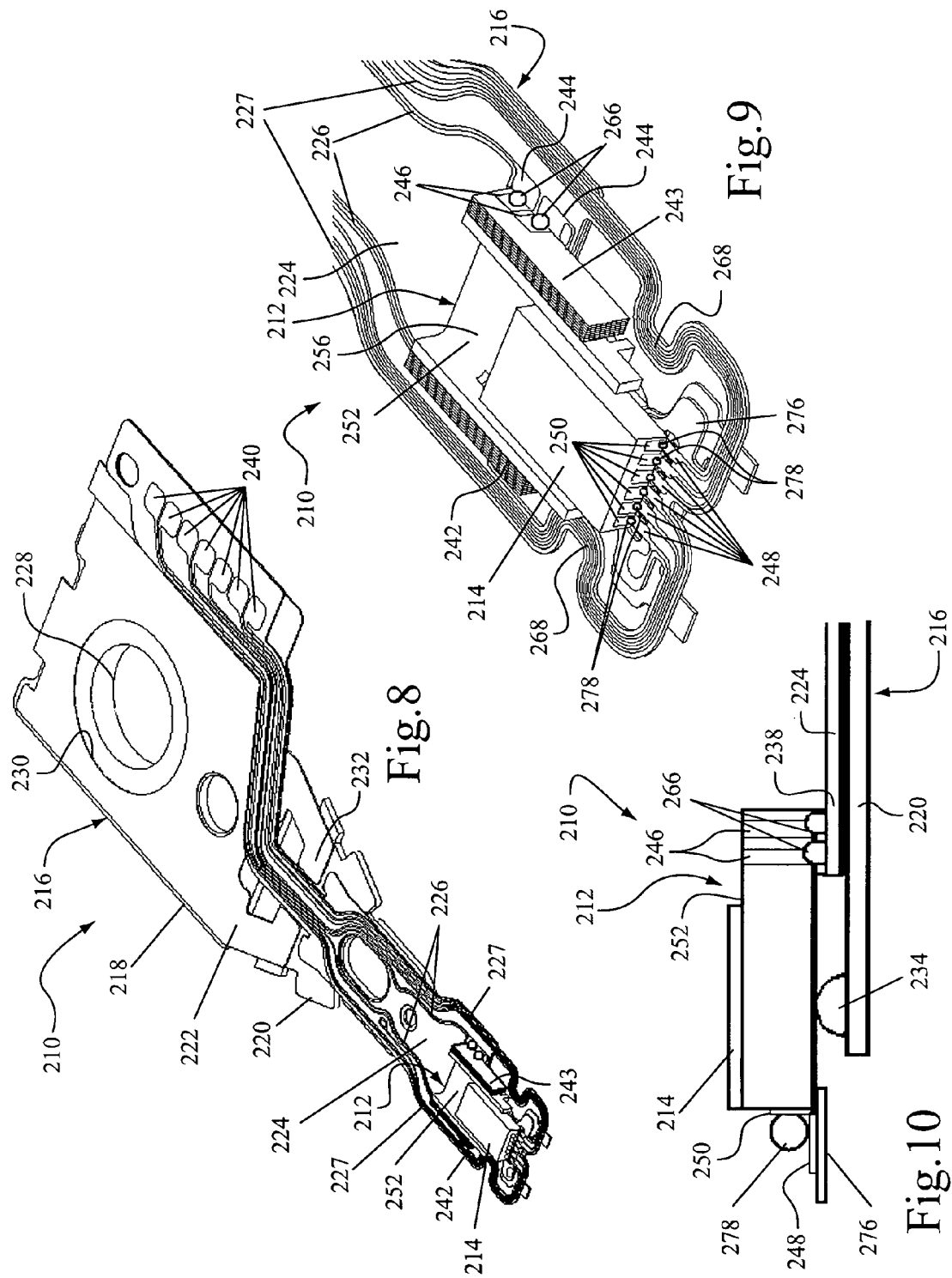

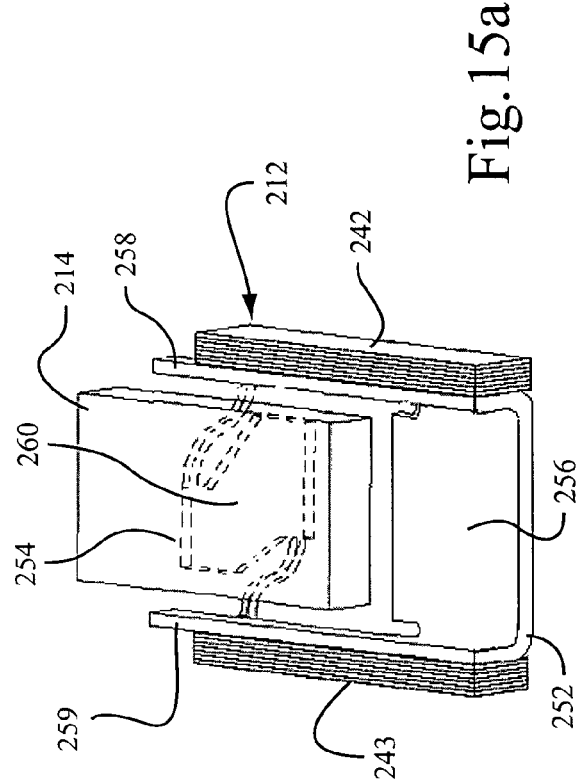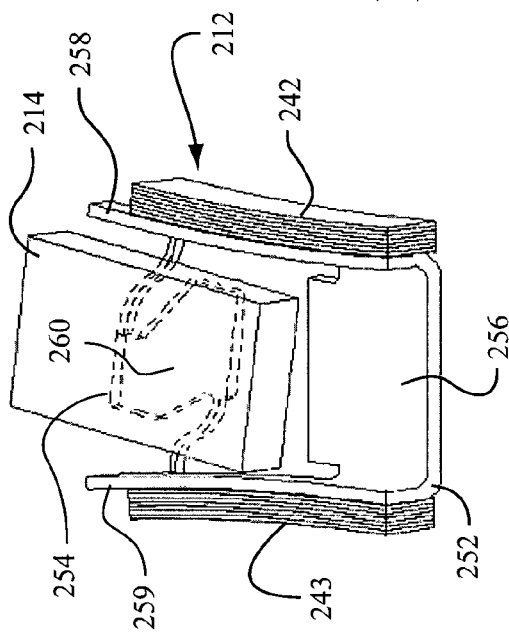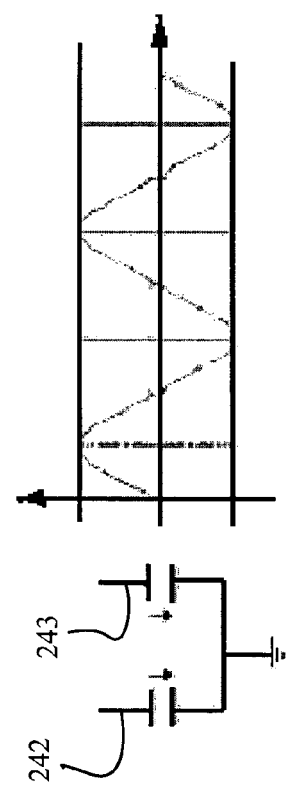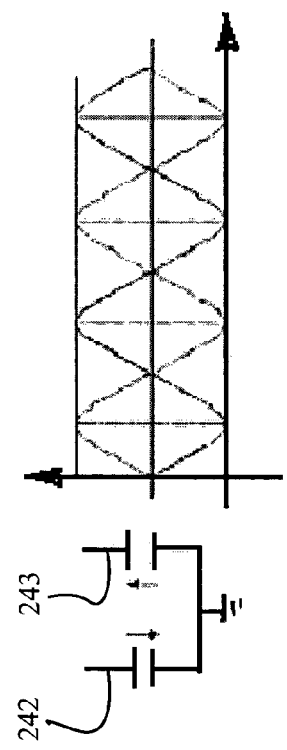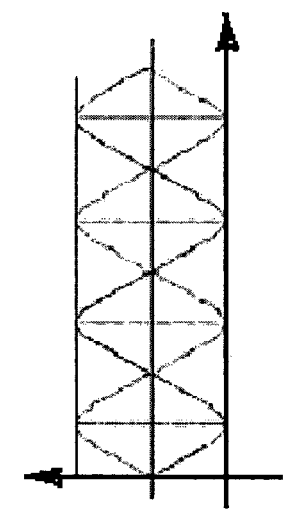

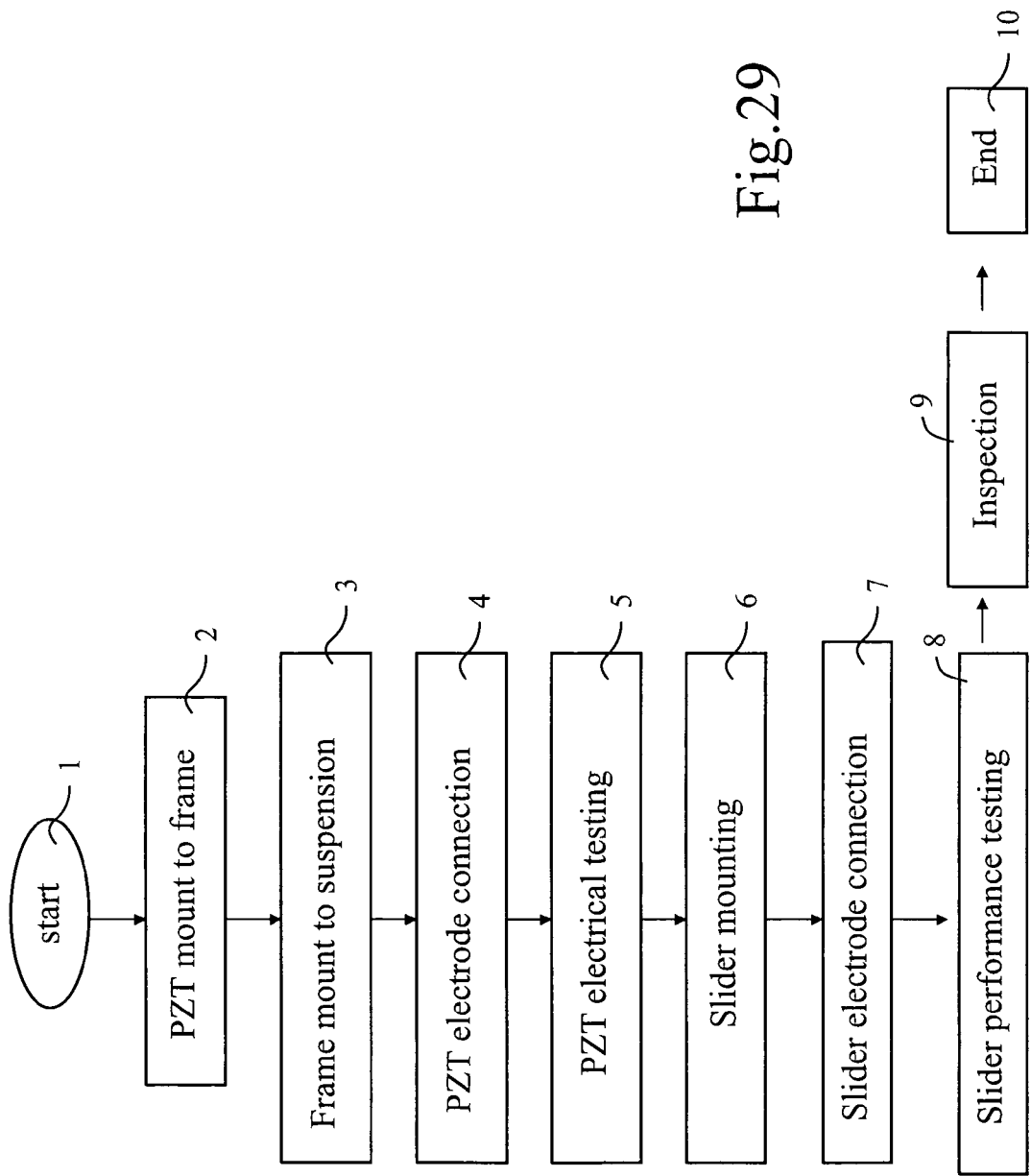

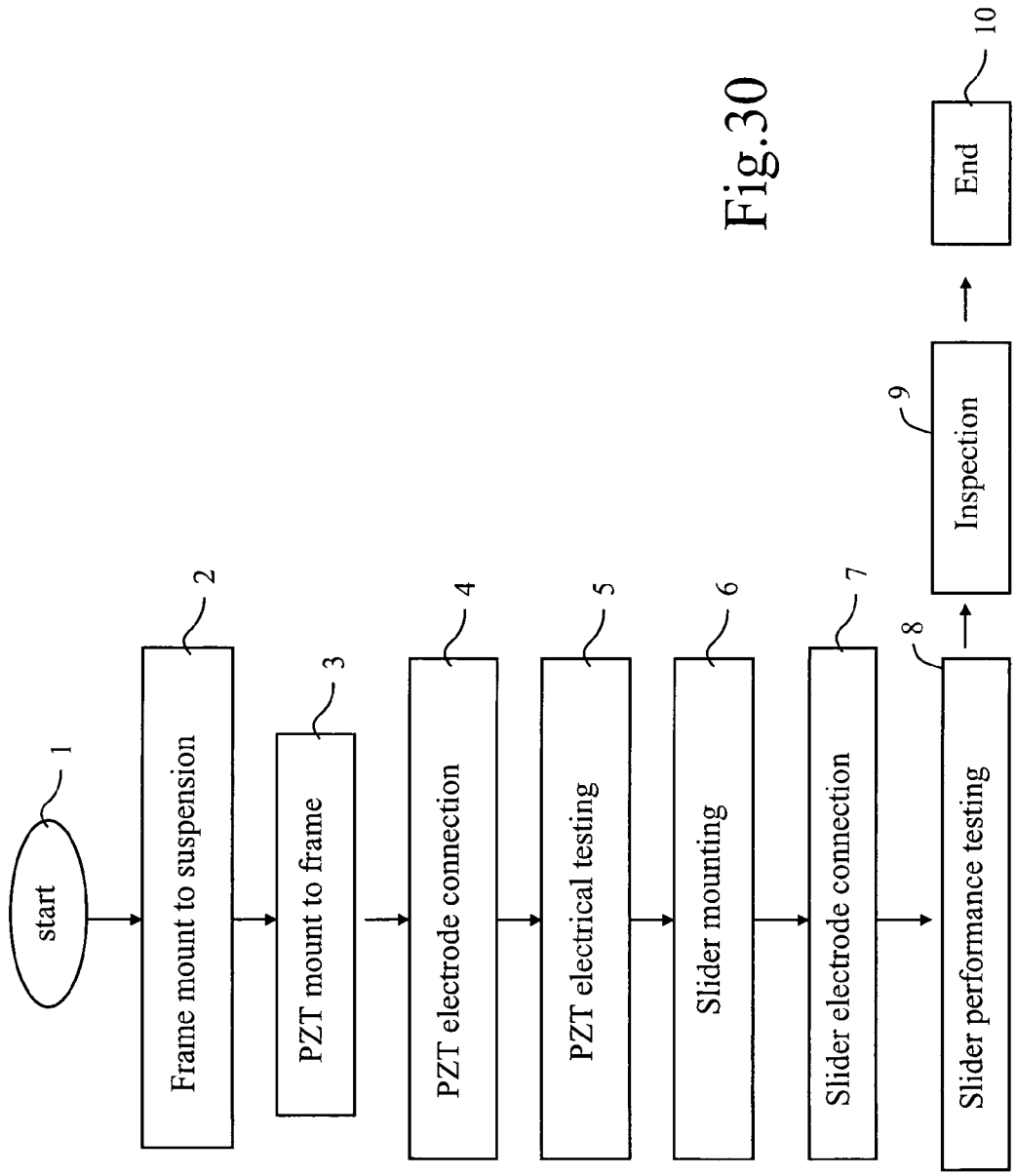

ROTATIONAL MICRO-ACTUATOR WITH A ROTATABLE PLATE, HEAD GIMBAL ASSEMBLY AND DISK DRIVE DEVICE WITH THE SAME

FIELD OF THE INVENTION

The present invention relates to information recording disk drive devices and, more particularly, to a micro-actuator for a head gimbal assembly (HGA) of the disk drive device.

BACKGROUND OF THE INVENTION

One known type of information storage device is a disk drive device that uses magnetic media to store data and a movable read/write head that is positioned over the media to selectively read from or write to the disk.

Consumers are constantly desiring greater storage capacity for such disk drive devices, as well as faster and more accurate reading and writing operations. Thus, disk drive manufacturers have continued to develop higher capacity disk drives by, for example, increasing the density of the information tracks on the disks by using a narrower track width and/or a narrower track pitch. However, each increase in track density requires that the disk drive device have a corresponding increase in the positional control of the read/write head in order to enable quick and accurate reading and writing operations using the higher density disks. As track density increases, it becomes more and more difficult using known technology to quickly and accurately position the read/write head over the desired information tracks on the storage media. Thus, disk drive manufacturers are constantly seeking ways to improve the positional control of the read/write head in order to take advantage of the continual increases in track density.

One approach that has been effectively used by disk drive manufacturers to improve the positional control of read/write heads for higher density disks is to employ a secondary actuator, known as a micro-actuator, that works in conjunction with a primary actuator to enable quick and accurate positional control for the read/write head. Disk drives that incorporate a micro-actuator are known as dual-stage actuator systems.

Various dual-stage actuator systems have been developed in the past for the purpose of increasing the access speed and fine tuning the position of the read/write head over the desired tracks on high density storage media. Such dual-stage actuator systems typically include a primary voice-coil motor (VCM) actuator and a secondary micro-actuator, such as a PZT element micro-actuator. The VCM actuator is controlled by a servo control system that rotates the actuator arm that supports the read/write head to position the read/write head over the desired information track on the storage media. The PZT element micro-actuator is used in conjunction with the VCM actuator for the purpose of increasing the positioning access speed and fine tuning the exact position of the read/write head over the desired track. Thus, the VCM actuator makes larger adjustments to the position of the read/write head, while the PZT element micro-actuator makes smaller adjustments that fine tune the position of the read/write head relative to the storage media. In conjunction, the VCM actuator and the PZT element micro-actuator enable information to be efficiently and accurately written to and read from high density storage media.

One known type of micro-actuator incorporates PZT elements for causing fine positional adjustments of the read/write head. Such PZT micro-actuators include associated electronics that are operable to excite the PZT elements on the micro-actuator to selectively cause expansion or contraction thereof. The PZT micro-actuator is configured such that expansion or contraction of the PZT elements causes movement of the micro-actuator which, in turn, causes movement of the read/write head. This movement is used to make faster and finer adjustments to the position of the read/write head, as compared to a disk drive unit that uses only a VCM actuator. Exemplary PZT micro-actuators are disclosed in, for example, JP 2002-133803, entitled "Micro-actuator and HGA" and JP 2002-074871, entitled "Head Gimbal Assembly Equipped with Actuator for Fine Position, Disk Drive Equipped with Head Gimbals Assembly, and Manufacture Method for Head Gimbal Assembly." Other exemplary PZT micro-actuators are also disclosed in, for example, U.S. Pat. Nos. 6,671,131 and 6,700,749.

FIG. 1 illustrates a conventional disk drive unit and show a magnetic disk 101 mounted on a spindle motor 102 for spinning the disk 101. A voice coil motor arm 104 carries a head gimbal assembly (HGA) 100 that includes a micro-actuator 105 with a slider 103 incorporating a read/write head. A voice-coil motor (VCM) is provided for controlling the motion of the motor arm 104 and, in turn, controlling the slider 103 to move from track to track across the surface of the disk 101, thereby enabling the read/write head to read data from or write data to the disk 101. In operation, a lift force is generated by the aerodynamic interaction between the slider 103, incorporating the read/write transducer, and the spinning magnetic disk 101. The lift force is opposed by equal and opposite spring forces applied by a suspension of the HGA 100 such that a predetermined flying height above the surface of the spinning disk 101 is maintained over a full radial stroke of the motor arm 104.

FIG. 2 illustrates the head gimbal assembly (HGA) 100 of the conventional disk drive device of FIG. 1 incorporating a dual-stage actuator. However, because of the inherent tolerances of the VCM and the head suspension assembly, the slider 103 cannot achieve quick and fine position control which adversely impacts the ability of the read/write head to accurately read data from and write data to the disk. As a result, a PZT micro-actuator 105, as described above, is provided in order to improve the positional control of the slider and the read/write head. More particularly, the PZT micro-actuator 105 corrects the displacement of the slider 103 on a much smaller scale, as compared to the VCM, in order to compensate for the resonance tolerance of the VCM and/or head suspension assembly. The micro-actuator 105 enables, for example, the use of a smaller recording track pitch, and can increase the "tracks-per-inch" (TPI) value by 50% for the disk drive unit, as well as provide an advantageous reduction in the head seeking and settling time. Thus, the PZT micro-actuator 105 enables the disk drive device to have a significant increase in the surface recording density of the information storage disks used therein.

As shown in FIG. 2, the HGA 100 includes a suspension 106 having a flexure 108. The flexure 108 provides a suspension tongue 110 to load the PZT micro-actuator 105 and the slider 103. Two outwardly protruding traces 112, 114 are provided to the flexure 108 on opposite sides of the suspension tongue 110. Each of the traces 112, 114 has one end portion connected with a float plate 116 and another end portion connected with multi traces 118 that are electrically connected to bonding pads 120.

Referring to FIG. 3, a conventional PZT micro-actuator 105 includes a metal frame 130 which has a top support 132, a bottom support 134, and two side arms 136, 138 that interconnect the two supports 132 and 134. The side arms 136, 138 each have a PZT element 140, 142 attached thereto. The slider 103 is supported on the top support 132.

Referring to FIGS. 4 and 5, the PZT micro-actuator 105 is physically coupled to the suspension tongue 110 by the bottom support 134 of the frame 130. The bottom support 134 may be mounted on the suspension tongue 110 by epoxy or laser welding, for example. Three electrical connection balls 150 (gold ball bonding or solder ball bonding, GBB or SBB) are provided to couple the PZT micro-actuator 105 to the suspension traces 118 located at the side of each PZT element 140, 142. In addition, there are multi ball for example four metal balls 152 (GBB or SBB) for coupling the slider 103 to the traces 118 for electrical connection of the read/write transducers. When power is supplied through the suspension traces 118, the PZT elements 140, 142 expand or contract to cause the two side arms 136, 138 to bend in a common lateral direction. The bending causes a shear deformation of the frame 130, e.g., the rectangular shape of the frame becomes approximately a parallelogram, which causes movement of the top support 132. This causes movement or lateral translation of the slider 103 connected thereto, thereby making the slider 103 move on the track of the disk in order to fine tune the position of the read/write head. In this manner, controlled displacement of slider 103 can be achieved for fine positional tuning.

To keep the slider 103 moving smoothly when the PZT elements 140, 142 deform, a parallel gap 180 is provided between the back side of the slider 103 and the suspension tongue 110 of the suspension 106. A dimple 190 in the suspension load beam 192 of the suspension 106 is provided to support the suspension tongue 110.

FIG. 6 illustrates how the PZT micro-actuator 105 works when a voltage is applied to the PZT elements 140, 142. For example, when a positive sine voltage is input to the PZT element 140 of the micro-actuator which has a positive polarization, in the first half period, the PZT element 140 will shrink and cause the side arm 136 to deform as a water waveform shape. Since the slider 103 is mounted on the top support 132, this deformation will cause the slider to move or sway towards the left side. Likewise, when a negative sine voltage is input to the PZT element 142 of the micro-actuator which has a positive polarization, in the second half period, the PZT element 142 will shrink and cause the side arm 138 to deform as a water waveform shape. This deformation will cause the slider 103 to move or sway towards the right side. Of course, this operation may depend on the electric control circle and PZT element polarization direction, but the work principle is well known.

The PZT micro-actuator 105 works in a translational or sway-like manner in which the PZT elements 140, 142 undergo intermissive contraction and extension that causes the PZT micro-actuator to deform as a water waveform shape and move the slider in a sway-like manner. This intermissive motion will generate reaction forces in the suspension tongue 110 through the bottom support 134 mounted to the suspension tongue 110. These reaction forces will generate a suspension resonance, which limits the performance characteristics of the disk drive device, especially for the servo bandwidth.

For example, FIG. 7 illustrates testing data of the resonance of a prior PZT micro-actuator design. As illustrated, when the PZT micro-actuator is operated (exciting the PZT), a suspension resonance is generated due the relatively large reaction force of the suspension. The curve 160 illustrates a resonance when the suspension base plate is shaken or excited, and the curve 170 illustrates a resonance when the PZT element of the micro-actuator is excited. As illustrated, the curves 160, 170 have similar forms.

Thus, there is a need for an improved system that does not suffer from the above-mentioned drawbacks.

SUMMARY OF THE INVENTION

One aspect of the present invention relates to a micro-actuator structured to improve resonance performance of the HGA.

Another aspect of the invention relates to a head gimbal assembly including a micro-actuator, a slider, and a suspension that supports the micro-actuator and the slider. The micro-actuator includes a metal frame including a top support to support the slider, a bottom support to connect to the suspension, and a pair of side arms that interconnect the top support and the bottom support. The top support includes a rotatable plate and connection arms that couple the rotatable plate to respective side arms. A PZT element is mounted to each of the side arms. Each PZT element is excitable to cause selective movement of the side arms. The suspension includes a load beam having a dimple that engages and supports the rotatable plate in use.

Another aspect of the invention relates to a disk drive device including a head gimbal assembly, a drive arm connected to the head gimbal assembly, a disk, and a spindle motor operable to spin the disk. The head gimbal assembly includes a micro-actuator, a slider, and a suspension that supports the micro-actuator and slider. The micro-actuator includes a metal frame including a top support to support the slider, a bottom support to connect to the suspension, and a pair of side arms that interconnect the top support and the bottom support. The top support includes a rotatable plate and connection arms that couple the rotatable plate to respective side arms. A PZT element is mounted to each of the side arms. Each PZT element is excitable to cause selective movement of the side arms. The suspension includes a load beam having a dimple that engages and supports the rotatable plate in use.

Another aspect of the invention relates to a micro-actuator for a head gimbal assembly. The micro-actuator includes a metal frame including a top support to adapted to support a slider, a bottom support adapted to be connected to a suspension, a pair of side arms that interconnect the top support and the bottom support, and arm members provided to respective side arms adjacent the bottom support. The top support includes a rotatable plate and connection arms that couple the rotatable plate to respective side arms. A PZT element is mounted to each of the side arms. Each PZT element is excitable to cause selective movement of the side arms.

Another aspect of the invention relates to a micro-actuator for a head gimbal assembly. The micro-actuator includes a metal frame including a top support to adapted to support a slider, a bottom support adapted to be connected to a suspension, and a pair of side arms that interconnect the top support and the bottom support. The top support includes a rotatable plate and connection arms that couple the rotatable plate to respective side arms. A PZT element is mounted to each of the side arms. Each PZT element is excitable to cause selective movement of the side arms. Each of the connection arms includes a notch adjacent a coupling location with the respective side arm.

Another aspect of the invention relates to a method for manufacturing a head gimbal assembly. The method includes mounting PZT elements to respective side arms of a micro-actuator frame, mounting a slider to the micro-actuator frame, mounting the micro-actuator frame to a suspension, electrically connecting the PZT elements to the suspension, electrically connecting the slider to the suspension, performing electrical testing of the PZT elements, performing performance testing of the slider, and inspecting the assembly.

Yet another aspect of the invention relates to a method for manufacturing a head gimbal assembly. The method includes mounting PZT elements to respective side arms of a micro-actuator frame, mounting the micro-actuator frame to a suspension, electrically connecting the PZT elements to the suspension, performing electrical testing of the PZT elements, mounting a slider to the micro-actuator frame, electrically connecting the slider to the suspension, performing performance testing of the slider, and inspecting the assembly.

Still another aspect of the invention relates to a method for manufacturing a head gimbal assembly. The method includes mounting a micro-actuator frame to a suspension, mounting PZT elements to respective side arms of the micro-actuator frame, electrically connecting the PZT elements to the suspension, performing electrical testing of the PZT elements, mounting a slider to the micro-actuator frame, electrically connecting the slider to the suspension, performing performance testing of the slider, and inspecting the assembly.

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various embodiments of this invention. In such drawings:

FIG. 3 is a perspective view of a slider and PZT micro-actuator of the HGA shown in FIG. 2;

FIG. 4 is a partial perspective view of the HGA shown in FIG. 2;

FIG. 5 is a side view of the HGA shown in FIG. 2;

FIG. 8 is a perspective view of a head gimbal assembly (HGA) including a PZT micro-actuator according to an embodiment of the present invention;

FIG. 9 is a partial perspective of the HGA shown in FIG. 8;

FIG. 10 is a partial side view of the HGA shown in FIG. 8;

FIG. 14a illustrates an embodiment of the electrical connection structure between PZT elements of the PZT micro-actuator shown in FIG. 8;

FIG. 14b illustrates a voltage applied to the PZT elements of the PZT micro-actuator shown in FIG. 8;

FIG. 15a is a top view of the slider and PZT micro-actuator of the HGA shown in FIG. 8 in a relaxed state;

FIG. 15b is a top view of the slider and PZT micro-actuator of the HGA shown in FIG. 8 when a voltage is applied;

FIG. 16a illustrates another embodiment of the electrical connection structure between PZT elements of the PZT micro-actuator shown in FIG. 8;

FIG. 16b illustrates another voltage applied to the PZT elements of the PZT micro-actuator shown in FIG. 8;

FIG. 29 is a flow chart illustrating a manufacturing and assembly process according to another embodiment of the present invention; and FIG. 30 is a flow chart illustrating a manufacturing and assembly process according to yet another embodiment of the present invention.

DETAILED DESCRIPTION OF ILLUSTRATED EMBODIMENTS

Figure 1:
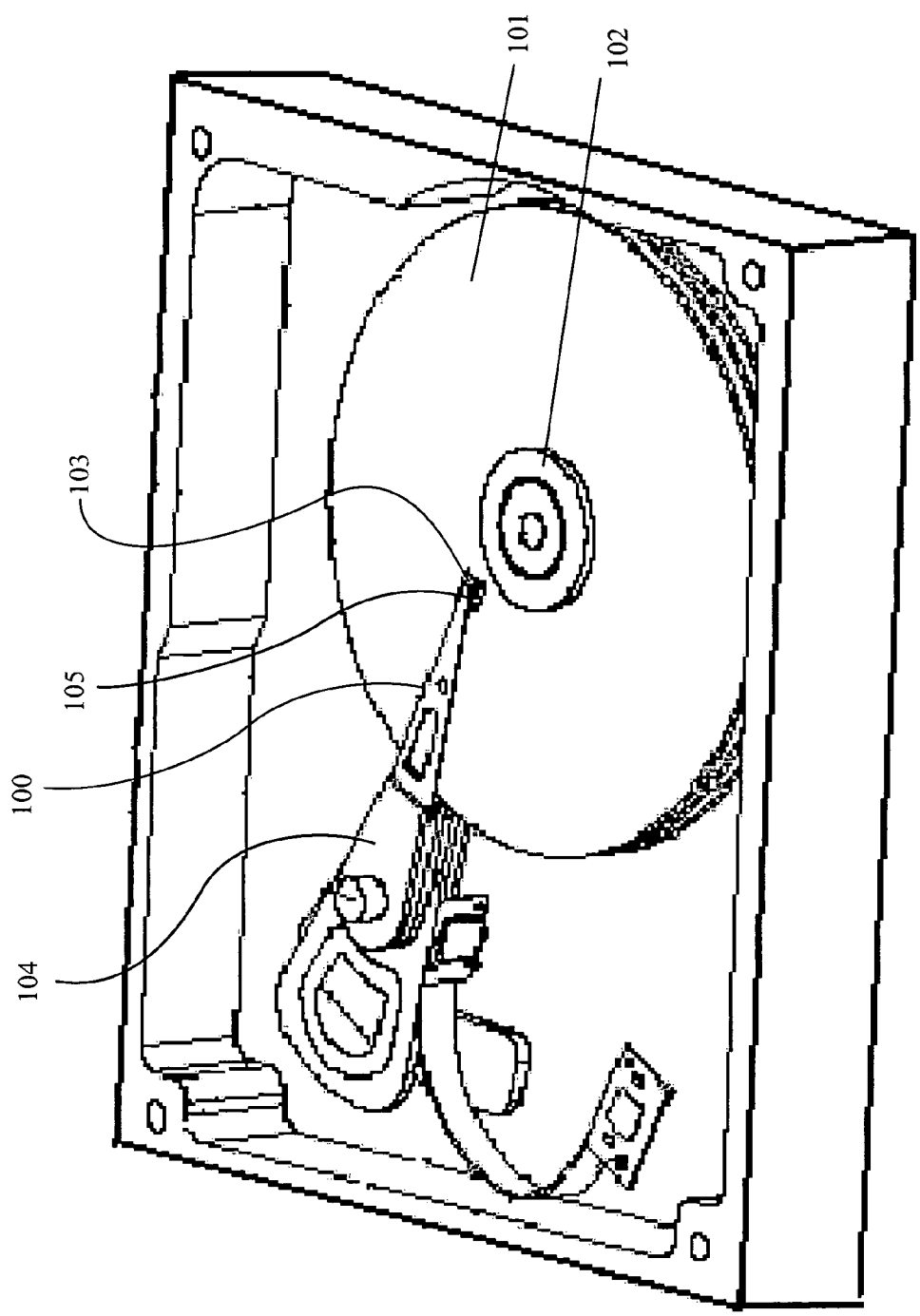
FIG. 1 is a perspective view of a conventional disk drive unit.
Figure 2:
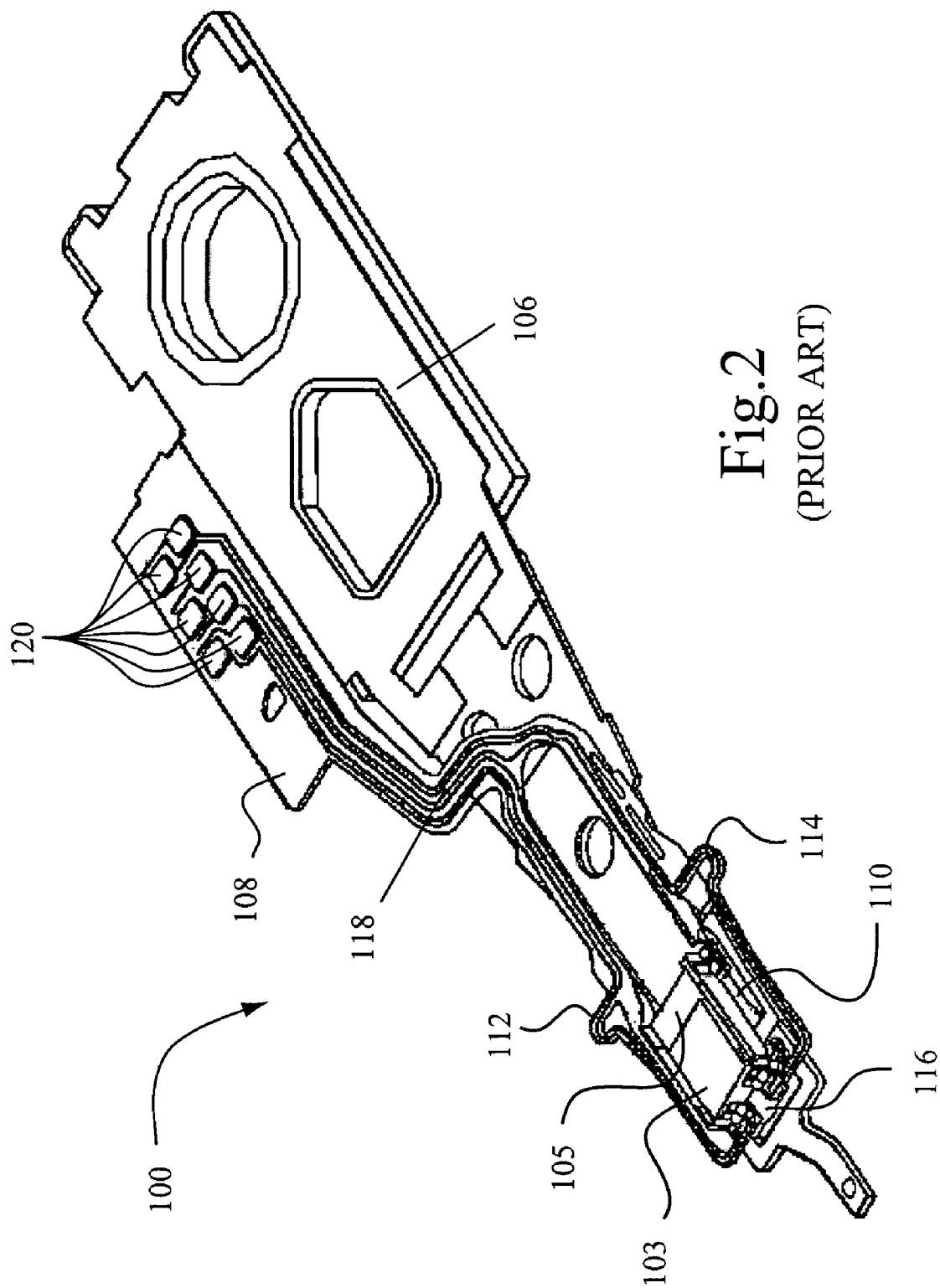
FIG. 2 is a perspective view of a conventional head gimbal assembly (HGA)

Various preferred embodiments of the instant invention will now be described with reference to the figures, wherein like reference numerals designate similar parts throughout the various views. As indicated above, the instant invention is designed to improve resonance performance in a head gimbal assembly (HGA) while precisely actuating the slider using the micro-actuator. An aspect of the instant invention is to provide a rotation-type PZT micro-actuator configured to improve resonance performance in the HGA. By improving resonance performance of the HGA, the performance characteristics of the disk drive device are improved.

Several example embodiments of a micro-actuator for a HGA will now be described. It is noted that the micro-actuator may be implemented in any suitable disk drive device having a micro-actuator in which it is desired to improve resonance performance, regardless of the specific structure of the HGA as illustrated in the figures. That is, the invention may be used in any suitable device having a micro-actuator in any industry.

FIGS. 8-13 illustrate a head gimbal assembly (HGA) 210 incorporating a PZT micro-actuator 212 according to a first exemplary embodiment of the present invention. The HGA 210 includes a PZT micro-actuator 212, a slider 214, and a suspension 216 to support the PZT micro-actuator 212 and the slider 214.

Figure 11:
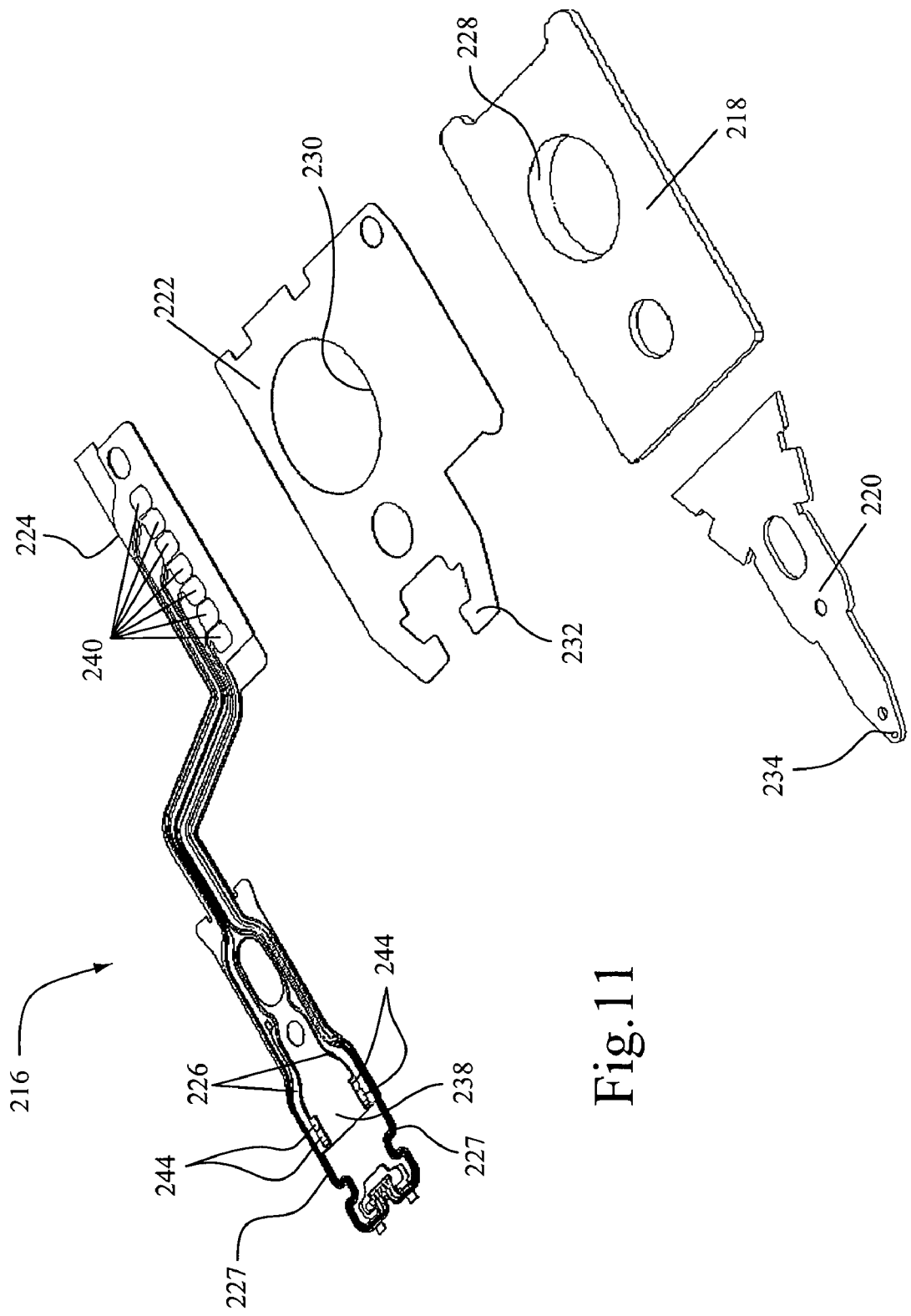
FIG. 11 is an exploded view of the suspension of the HGA shown in FIG. 8.
Figure 12:
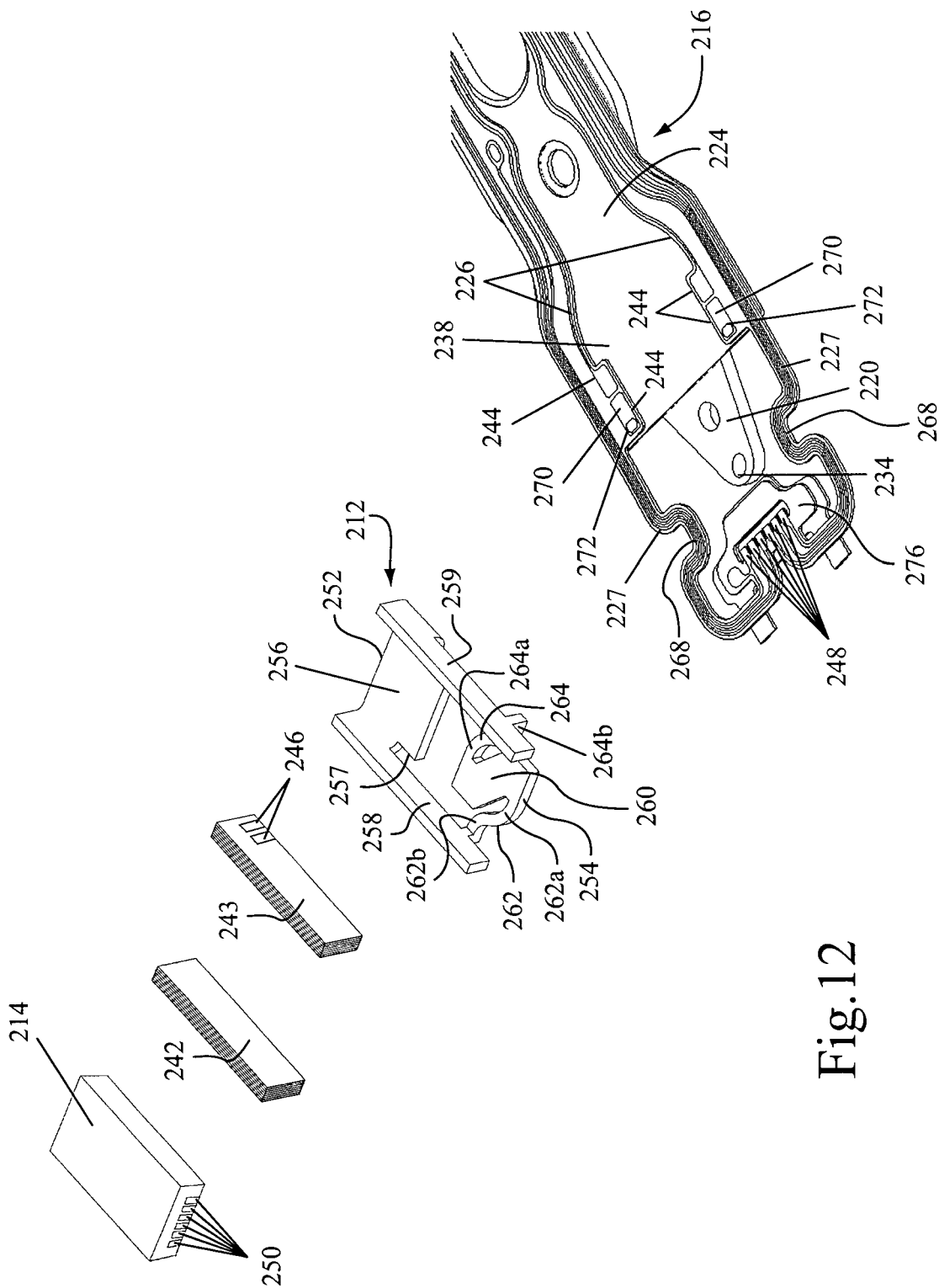
FIG. 12 is an exploded view of the HGA shown in FIG. 8.

As best shown in FIGS. 8, 11, and 12, the suspension 216 includes a base plate 218, a load beam 220, a hinge 222, a flexure 224, and inner and outer suspension traces 226, 227 in the flexure 224. The base plate 218 includes a mounting hole 228 for use in connecting the suspension 216 to a drive arm of a voice coil motor (VCM) of a disk drive device. The shape of the base plate 218 may vary depending on the configuration or model of the disk drive device. Also, the base plate 218 is constructed of a relatively hard or rigid material, e.g., metal, to stably support the suspension 216 on the drive arm of the VCM.

The hinge 222 is mounted onto the base plate 218 and load beam 220, e.g., by welding. As illustrated, the hinge 222 includes a hole 230 that aligns with the hole 228 provided in the base plate 218. Also, the hinge 222 includes a holder bar 232 for supporting the load beam 220.

The load beam 220 is mounted onto the holder bar 232 of the hinge 222, e.g., by welding. The load beam 220 has a dimple 234 formed thereon for engaging the PZT micro-actuator 212 (see FIGS. 10-12). As illustrated in FIG. 10, the dimple 234 is located in the center of the slider 214.

The flexure 224 is mounted to the hinge 222 and the load beam 220, e.g., by lamination or welding. The flexure 224 provides a top region or suspension tongue 238 to couple the PZT micro-actuator 212 to the suspension 216 (see FIGS. 10 and 12). Also, the suspension traces 226, 227 are provided on the flexure 224 to electrically connect a plurality of connection pads 240 (which connect to an external control system) with the slider 214 and the PZT elements 242, 243 on the PZT micro-actuator 212. The suspension traces 226, 227 may be a flexible printed circuit (FPC) and may include any suitable number of lines.

As best shown in FIGS. 9, 10, and 12, bonding pads 244 are directly connected to the inner suspension traces 226 to electrically connect the inner suspension traces 226 with bonding pads 246 provided on the PZT elements 242, 243. Also, bonding pads 248 are directly connected to the outer suspension traces 227 to electrically connect the outer suspension traces 227 with bonding pads 250 provided on the slider 214.

A voice-coil motor (VCM) is provided in the disk drive device for controllably driving the drive arm and, in turn, the HGA 210 in order to enable the HGA 210 to position the slider 214, and associated read/write head, over any desired information track on a disk in the disk drive device. The PZT micro-actuator 212 is provided to enable faster and finer positional control for the device, as well as to reduce the head seeking and settling time during operation. Thus, when the HGA 210 is incorporated into a disk drive device, a dual-stage actuator system is provided in which the VCM actuator provides large positional adjustments and the PZT micro-actuator 212 provides fine positional adjustments for the read/write head.

Figure 13:
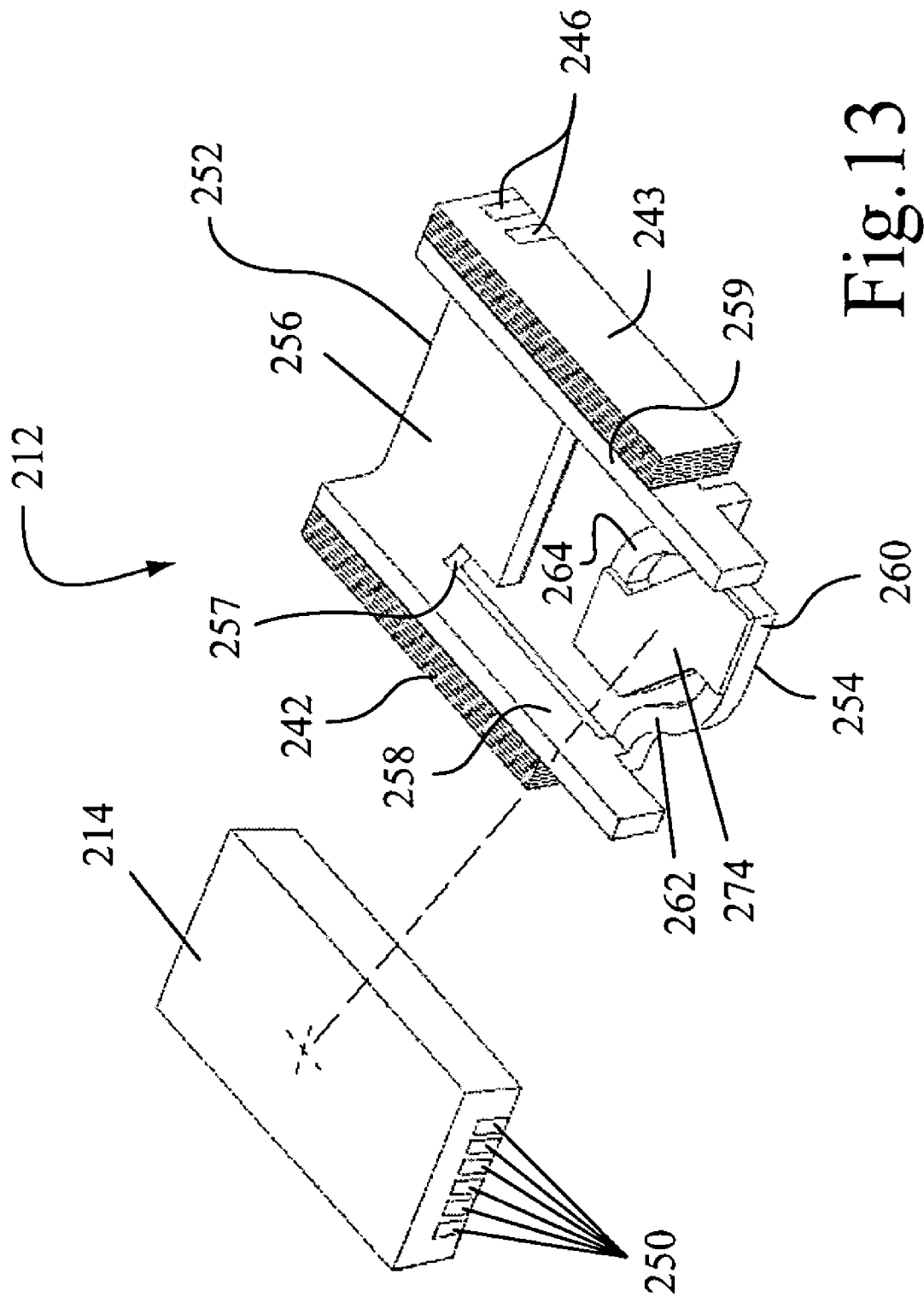
FIG. 13 is an exploded view of the PZT micro-actuator and slider shown in FIG. 8 removed from the HGA.

FIGS. 12 and 13 illustrate the PZT micro-actuator 212 removed from the slider 214 and the suspension 216. As illustrated, the PZT micro-actuator 212 includes a micro-actuator frame 252 and PZT elements 242, 243 mounted to respective side arms of the frame 252.

The frame 252 includes a top support 254, a bottom support 256, and side arms 258, 259 that interconnect the top support 254 and bottom support 256. The top support 254 includes a rotatable plate 260 and connection arms or bridges 262, 264 that couple the plate 260 to respective side arms 258, 259. The frame 252 is preferably constructed of a metal material, however other suitable materials are possible.

The side arms 258, 259 are formed from opposing sides of the top and bottom supports 254, 256. As illustrated, inner notches or spaces 257 exist between the bottom support 256 and respective side arms 258, 259. This arrangement provides the side arms 258, 259 with a longer active length and will allow the side arms 258, 259 more freedom of movement.

As best shown in FIG. 12, the bridge 262 is curve-shaped and has opposing ends 262a, 262b, and the bridge 264 is curve-shaped has opposing ends 264a, 264b. The ends 262a and 264a are coupled with the rotatable plate 260, and the other ends 262b and 264b are coupled with respective side arms 258, 259. In the illustrated embodiment, the ends 262b and 264b are coupled with respective side arms 258, 259 in the same location in the y-axis direction, i.e., the ends 262b and 264b have the same distance between the coupling point to the end of the respective side arm 258, 259. Also, the ends 262a and 264a are coupled with the rotatable plate 260 in mirror relation to a center of the rotatable plate 260. That is, the coupling points of the ends 262a and 264a are symmetrically located with respect to the center of gravity of the rotatable plate 260. This arrangement allows the rotatable plate 260 to rotate around its center of gravity when the PZT elements 242, 243 are excited in use. However, the bridges 262, 264 may have other suitable shapes and coupling arrangements.

A PZT element 242, 243 is mounted to an outwardly facing surface of a respective side arm 258, 259 of the frame 252. Bonding pads 246, e.g., two pads, are provided on the PZT elements 242, 243 for electrically connecting the PZT elements 242, 243 to the inner suspension traces 226. Each PZT element 242, 243 may be a ceramic PZT, thin-film PZT, or PMN-Pt, and may be single-layer or multi-layer.

As best shown in FIGS. 9, 10, and 12, the bottom support 256 is structured to connect the micro-actuator frame 252 to the suspension 216. Specifically, the bottom support 256 is partially mounted to the top region or suspension tongue 238 of the flexure 224, e.g., by epoxy, resin, or welding. Also, the PZT bonding pads 246, e.g., two bonding pads, provided on respective PZT elements 242, 243 are electrically connected to respective bonding pads 244 on the inner suspension traces 226 using electrical connection balls (GBB or SBB) 266. This allows power to be applied via the inner suspension traces 226 to the PZT elements 242, 243.

In the illustrated embodiment, one of the bonding pads 244 on the inner suspension traces 226 includes an electrode part 270 and a ground part 272 (see FIG. 12). This bonding pad 244 grounds the suspension 216, e.g., constructed of stainless steel, through the ground part 272 and ensures or guarantees that only a single trace of the inner suspension traces 226 couples each PZT element 242, 243 with the plurality of connection pads 240 which connect to an external control system.

The top support 254 is structured to connect the frame 252 to the slider 214. Specifically, the rotatable plate 260 includes a step 274, e.g., constructed of a polymer layer, epoxy layer, or metal layer. The slider 214 is partially mounted on the step 274 of the rotatable plate 260 so that the slider 214 will not touch or engage the connection arms or bridges 262, 264 when the PZT micro-actuator 212 is operated. Moreover, multiple bonding pads 250, e.g., six bonding pads, provided on the slider 214 are electrically bonded with respective pads 248 provided on a float plate 276 using, for example, electric connection balls (GBB or SBB) 278. This connects the top support 254 to the slider 214 and electrically connects the slider 214 and its read/write elements to the outer suspension traces 227 on the suspension 216.

In the illustrated embodiment, the outer suspension traces 227 each include a curved portion 268 adjacent respective sides of the slider 214. This arrangement helps to release stress due to stiffness of the outer suspension traces 227 when the PZT micro-actuator 212 is operated, which makes the PZT micro-actuator 212 work more smoothly.

Also, the dimple 234 of the suspension load beam 220 supports the gravity center of the rotatable plate 260. Thus, no parallel gap exists between the PZT micro-actuator 212 and the dimple 234, which facilitates manufacturing. Specifically, this arrangement does not require control of a gap or control of the stiffness of the suspension tongue to prevent tongue deformation that is known in the art.

In the illustrated embodiment, the slider 214 is mounted to the rotatable plate 260 of the top support 256 such that the center of gravity of the slider 214 will substantially match the center of gravity of the rotatable plate 260. Also, the bottom support 254 of the PZT micro-actuator 212 is mounted on the suspension tongue 238 such that the center of gravity of the rotatable plate 260 substantially matches with the dimple 234 of the suspension 216. This arrangement allows the slider 214 and the rotatable plate 260 to rotate around the center of suspension dimple 234 when the rotatable plate 260 is rotated by exciting the PZT elements 242, 243.

FIG. 14a illustrates an embodiment of an electrical connection structure between the two PZT elements 242, 243 of the PZT micro-actuator 212, and FIG. 14b illustrates the operation voltage. As illustrated, the PZT elements 242, 243 have the same polarization direction and have a common ground. Also, a sine voltage is applied to operate the PZT elements 242, 243. FIG. 15a illustrates the PZT micro-actuator 212 in a relaxed state, and FIG. 15b illustrates the PZT micro-actuator 212 when voltage is applied. As shown in FIG. 15b, when the voltage goes to the first half period, the PZT elements 242, 243 will shrink, which will cause both side arms 258, 259 to bend towards the outside. Since the two bridges 262, 264 are coupled to the rotatable plate 260 in offset relation with respect to its center and the slider 214 is mounted on the rotatable plate 260, the slider 214 will rotate against its center towards the right side. When the voltage goes to the second half period, the PZT elements 242, 243 will return back or extend and the slider 214 will rotate back accordingly.

FIG. 16a illustrates another embodiment of an electrical connection structure between the two PZT elements 242, 243 of the PZT micro-actuator 212, and FIG. 16b illustrates the operation voltage. As illustrated, the PZT elements 242, 243 have opposite polarization directions and have a common ground. Also, two different sine voltages are applied to the PZT elements 242, 243 to operate the PZT elements 242, 243 separately. When the voltage goes to the first half period, since one of the PZT elements 242, 243 has a positive polarization direction and the other of the PZT elements 242, 243 has a negative polarization direction, the PZT elements 242, 243 will shrink, which will cause both side arms 258, 259 to bend towards the outside. Since the two bridges 262, 264 are coupled to the rotatable plate 260 in offset relation with respect to its center and the slider 214 is mounted on the rotatable plate 260, the slider 214 will rotate against its center towards the right side (e.g., see FIG. 15b). When the voltage goes to the second half period, the PZT elements 242, 243 will return back or extend and the slider 214 will rotate back accordingly.

Figure 7:
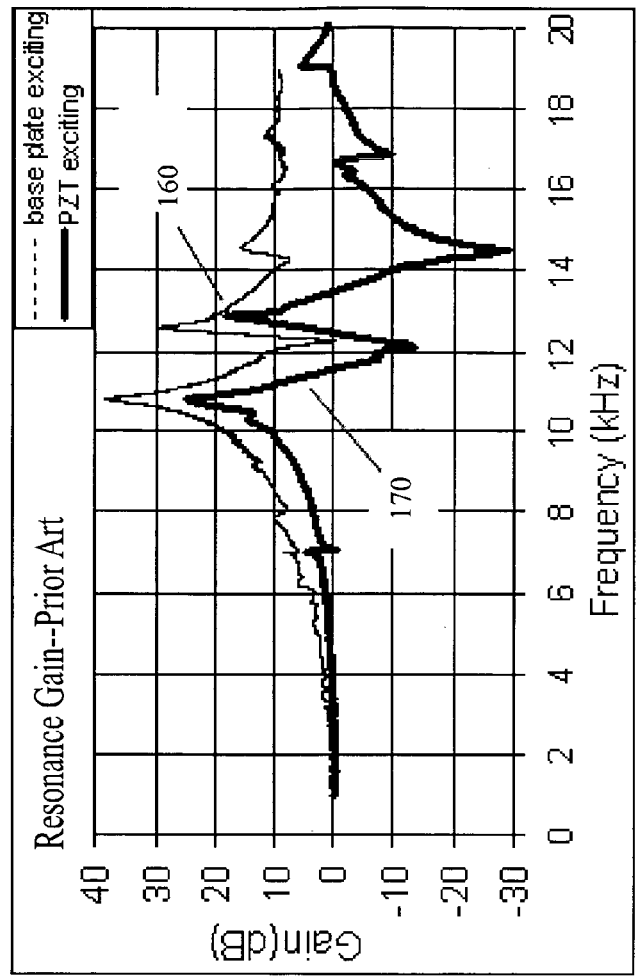
FIG. 7 shows testing data of the resonance of a prior PZT micro-actuator design.
Figure 6:
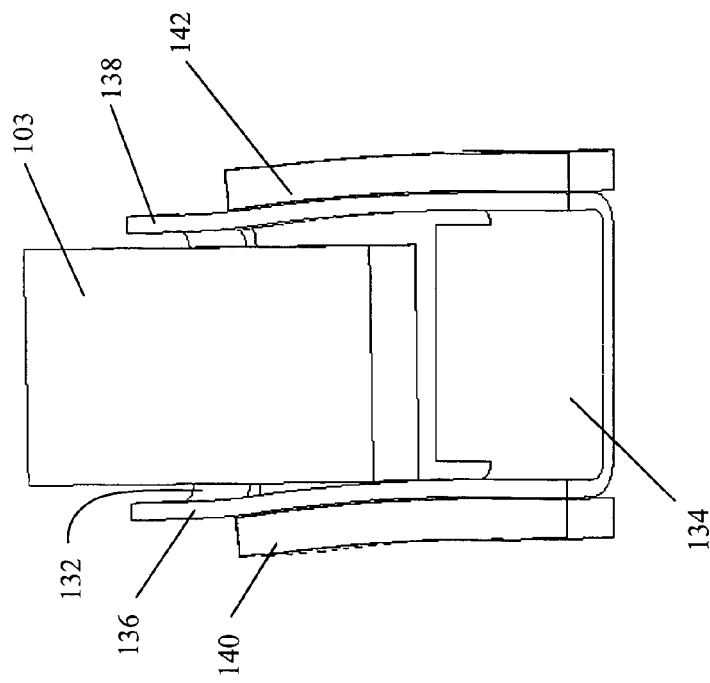
FIG. 6 is a top view of the slider and PZT micro-actuator of the HGA shown in FIG. 2 in use.
Figure 17:
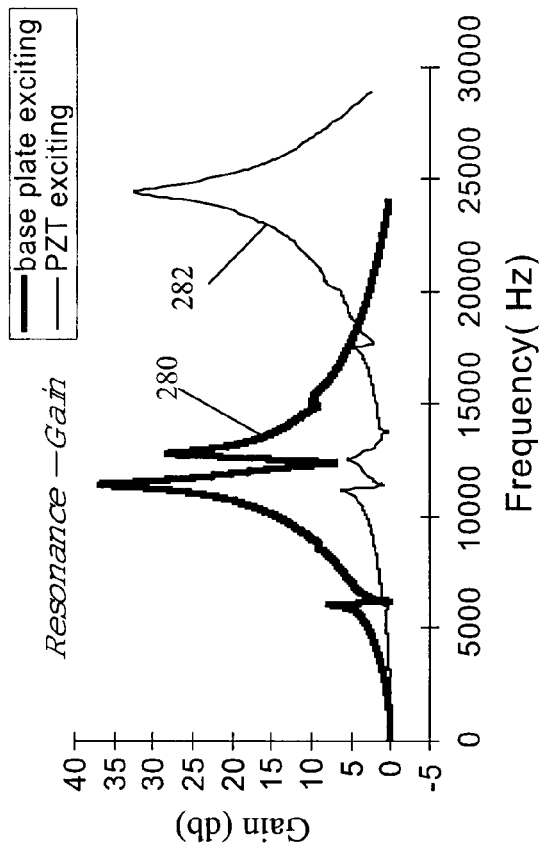
FIG. 17 shows testing data of the resonance gain of the PZT micro-actuator shown in FIG. 8.
Figure 18:
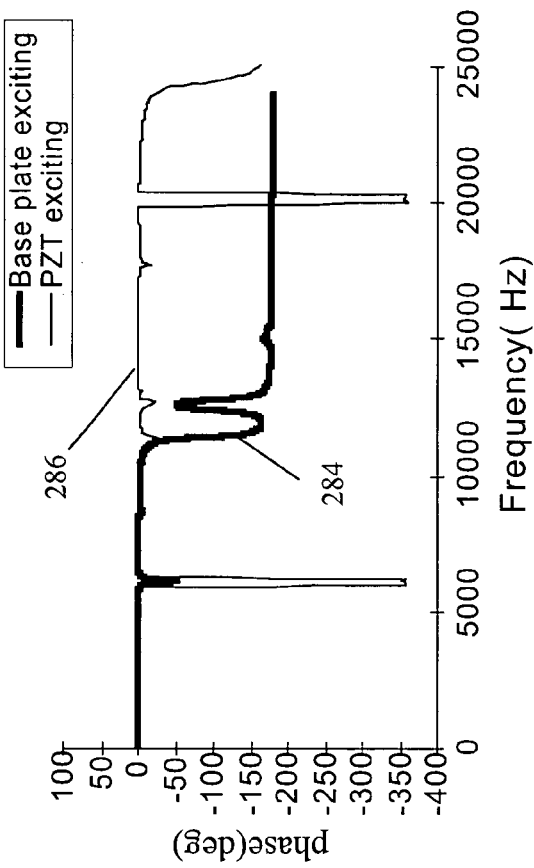
FIG. 18 shows testing data of the resonance phase of the PZT micro-actuator shown in FIG. 8.

FIGS. 17 and 18 illustrate resonance testing data of the PZT micro-actuator 212. FIG. 17 illustrates a resonance gain and FIG. 18 illustrates a resonance phase. As illustrated, the curves 280 and 284 illustrate the resonance gain and phase when the suspension base plate is shaken or excited, and the curves 282 and 286 illustrate the resonance gain and phase when the PZT elements 242, 243 of the PZT micro-actuator 212 are excited. Since the PZT micro-actuator 212 works as a rotation-type rather than a prior sway-type, a relatively small reaction force is applied to the suspension when the PZT micro-actuator 212 is operated which improves the resonance. That is, the PZT micro-actuator 212 does not have a suspension resonance model like the prior model represented in FIG. 7. Thus, the PZT micro-actuator 212 greatly improves the performance characteristics of the disk drive device and a high bandwidth of the servo may be achieved.

Also, since the PZT micro-actuator 212 works as a rotation-type rather than a prior sway-type, the suspension structure may be simplified especially for tongue structure. This may facilitate manufacture of the suspension and reduce costs. Further, this may improve the static and dynamic performance of the HGA, e.g., the shock performance due to the mass reduction.

Figure 19:
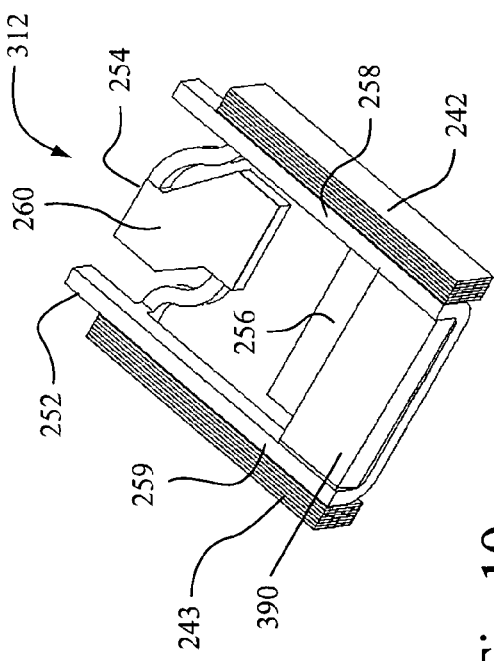
FIG. 19 is a top perspective view of a PZT micro-actuator according to another embodiment of the present invention.

FIG. 19 illustrates a PZT micro-actuator 312 according to another exemplary embodiment of the present invention. In this embodiment, a rigid material or block 390, e.g., constructed of a metal material, is mounted between the side arms 258, 259 of the frame 252 and may be supported by the bottom support 256. This arrangement may help to prevent out of phase deformation of the side arms 258, 259 when the PZT micro-actuator 312 is operated. The remaining components of the PZT micro-actuator 312 are substantially similar to the PZT micro-actuator 212 and indicated with similar reference numerals. Although structurally different, the PZT micro-actuator 312 has a substantially similar work principle as the PZT micro-actuator 212.

Figure 20:
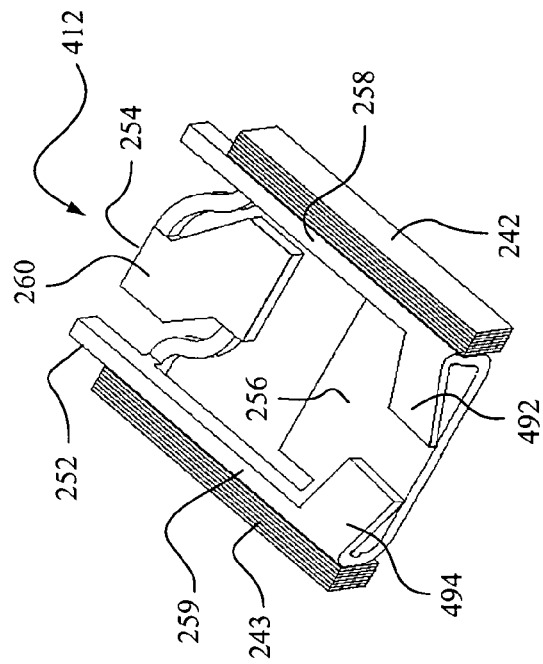
FIG. 20 is a top perspective view of a PZT micro-actuator according to another embodiment of the present invention.

FIG. 20 illustrates a PZT micro-actuator 412 according to another exemplary embodiment of the present invention. In this embodiment, arm members 492, 494 are provided to respective side arms 258, 259 of the frame 252 adjacent the bottom support 256. As illustrated, the arm members 492, 494 are bent towards the bottom support 256 and may have free ends that engage the bottom support 256. This arrangement may help to prevent out of phase deformation of the side arms 258, 259 when the PZT micro-actuator 412 is operated. The remaining components of the PZT micro-actuator 412 are substantially similar to the PZT micro-actuator 212 and indicated with similar reference numerals. Although structurally different, the PZT micro-actuator 412 has a substantially similar work principle as the PZT micro-actuator 212.

Figure 21:
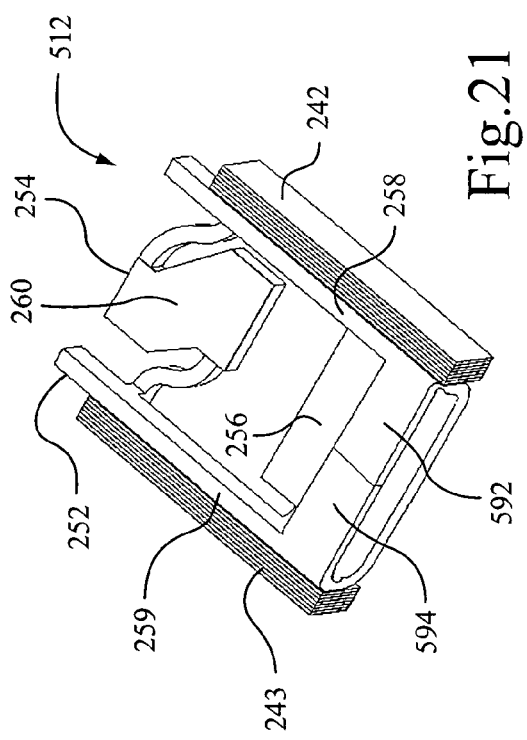
FIG. 21 is a top perspective view of a PZT micro-actuator according to another embodiment of the present invention.

FIG. 21 illustrates a PZT micro-actuator 512 according to another exemplary embodiment of the present invention. In this embodiment, arm members 592, 594 are provided to respective side arms 258, 259 of the frame 252 adjacent the bottom support 256. As illustrated, the arm members 592, 594 extend towards one another and in generally parallel relation to the bottom support 256. Also, the arm members 592, 594 may have free ends that engage one another. This arrangement may help to prevent out of phase deformation of the side arms 258, 259 when the PZT micro-actuator 512 is operated. The remaining components of the PZT micro-actuator 512 are substantially similar to the PZT micro-actuator 212 and indicated with similar reference numerals. Although structurally different, the PZT micro-actuator 512 has a substantially similar work principle as the PZT micro-actuator 212.

Figure 22:
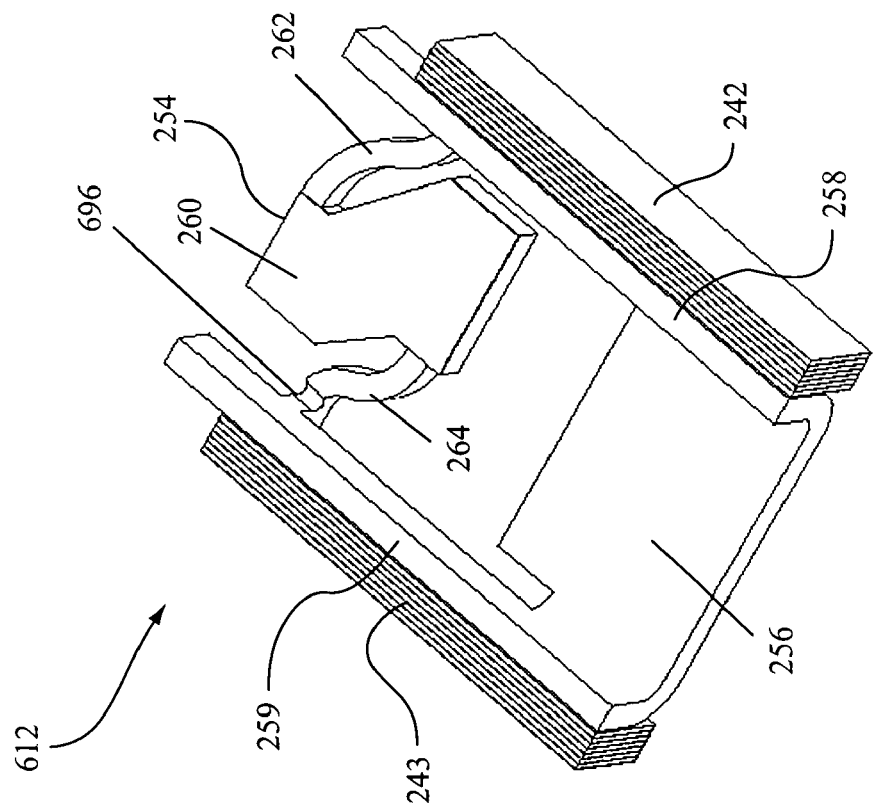
FIG. 22 is a top perspective view of a PZT micro-actuator according to another embodiment of the present invention.

FIG. 22 illustrates a PZT micro-actuator 612 according to another exemplary embodiment of the present invention. In this embodiment, a notch 696 is formed, e.g., by partial etching, in each bridge 262, 264 adjacent the coupling location with respective side arms 258, 259 (only one notch 696 being visible). As illustrated, the notch 696 is formed on a front or inner surface of the bridges 262, 264 facing the slider 214 in use. The partially etched notch 696 may facilitate the forming process. This arrangement may help to prevent out of phase deformation of the side arms 258, 259 when the PZT micro-actuator 612 is operated. The remaining components of the PZT micro-actuator 612 are substantially similar to the PZT micro-actuator 212 and indicated with similar reference numerals. Although structurally different, the PZT micro-actuator 612 has a substantially similar work principle as the PZT micro-actuator 212.

Figure 23:
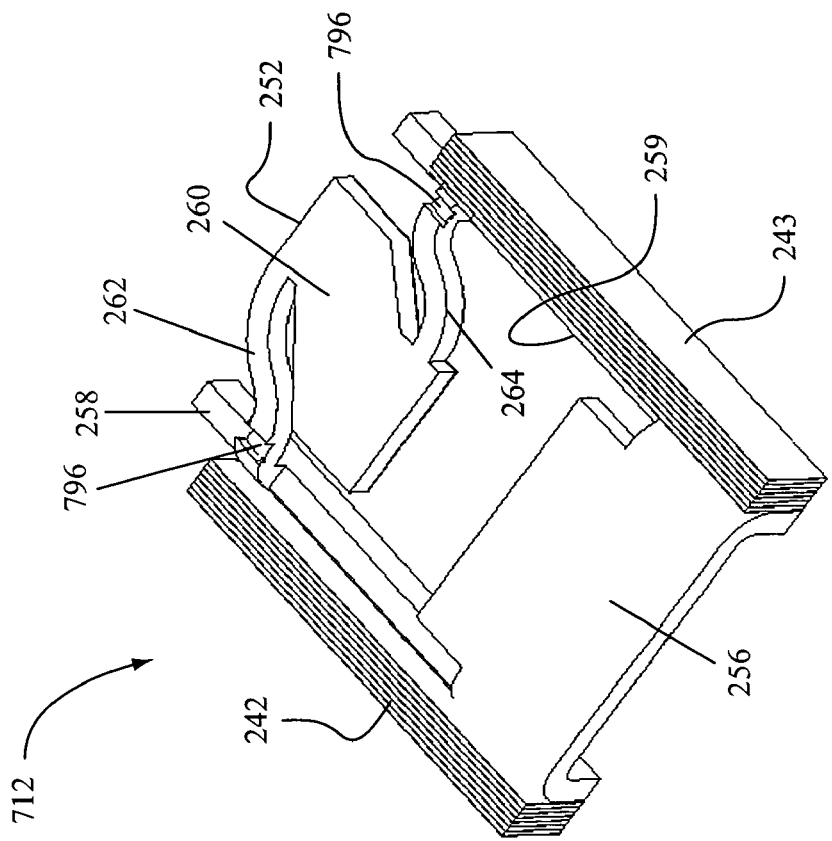
FIG. 23 is a bottom perspective view of a PZT micro-actuator according to another embodiment of the present invention.

FIG. 23 illustrates a PZT micro-actuator 712 according to another exemplary embodiment of the present invention. In this embodiment, a notch 796 is formed, e.g., by partial etching, in each bridge 262, 264 adjacent the coupling location with respective side arms 258, 259. As illustrated, the notch 796 is formed on a back surface of the bridges 262, 264 facing away from the slider 214 in use. The partially etched notch 696 may facilitate the forming process. This arrangement may help to prevent out of phase deformation of the side arms 258, 259 when the PZT micro-actuator 712 is operated. The remaining components of the PZT micro-actuator 712 are substantially similar to the PZT micro-actuator 212 and indicated with similar reference numerals. Although structurally different, the PZT micro-actuator 712 has a substantially similar work principle as the PZT micro-actuator 212.

Figure 24:
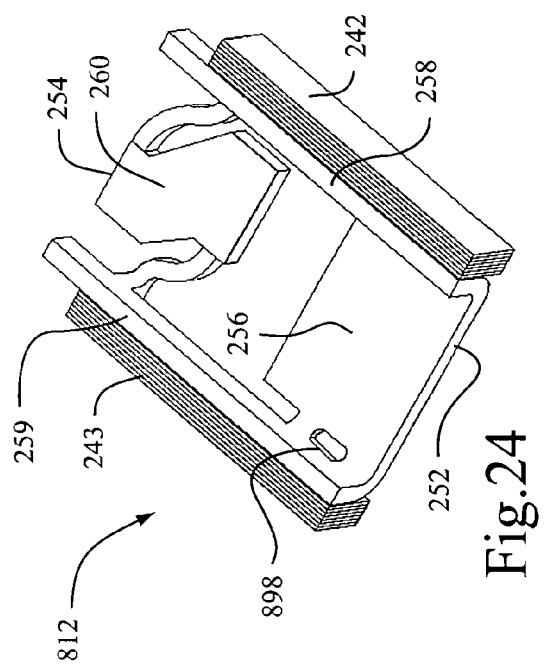
FIG. 24 is a top perspective view of a PZT micro-actuator according to yet another embodiment of the present invention.

FIG. 24 illustrates a PZT micro-actuator 812 according to another exemplary embodiment of the present invention. In this embodiment, a hole or opening 898 is formed in the bottom support 256 adjacent each coupling location with respective side arms 258, 259 (only one hole 898 being visible). The holes 898 help to reduce the coupling stiffness when the PZT micro-actuator 812 is operated. The remaining components of the PZT micro-actuator 812 are substantially similar to the PZT micro-actuator 212 and indicated with similar reference numerals. Although structurally different, the PZT micro-actuator 812 has a substantially similar work principle as the PZT micro-actuator 212.

Figure 25:
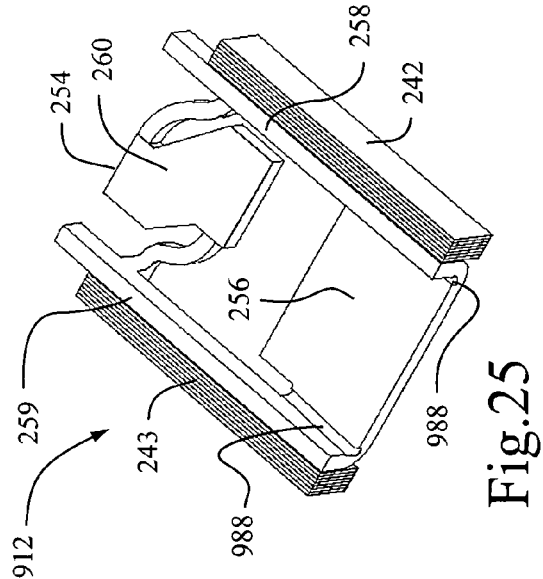
FIG. 25 is a top perspective view of a PZT micro-actuator according to yet another embodiment of the present invention.

FIG. 25 illustrates a PZT micro-actuator 912 according to another exemplary embodiment of the present invention. In this embodiment, a notch 988 is formed, e.g., by partial etching, in the bottom support 256 adjacent each coupling location with respective side arms 258, 259. The notches 988 help to reduce the coupling stiffness when the PZT micro-actuator 912 is operated. The remaining components of the PZT micro-actuator 912 are substantially similar to the PZT micro-actuator 212 and indicated with similar reference numerals. Although structurally different, the PZT micro-actuator 912 has a substantially similar work principle as the PZT micro-actuator 212.

Figure 26:
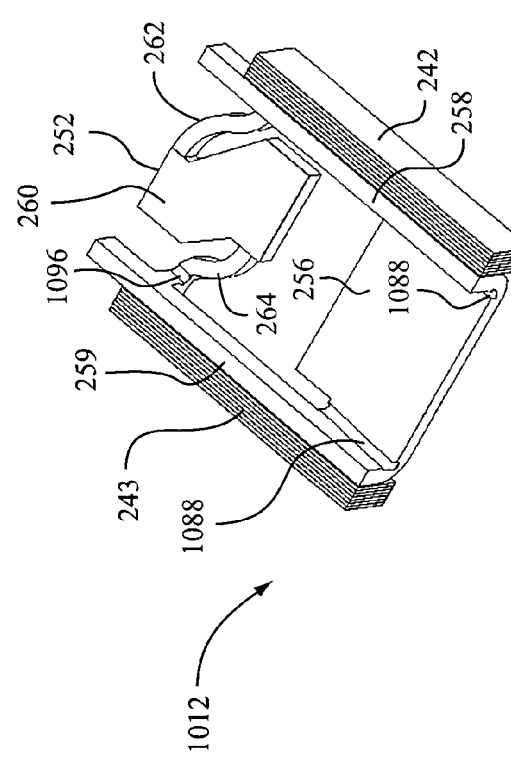
FIG. 26 is a top perspective view of a PZT micro-actuator according to yet another embodiment of the present invention.

FIG. 26 illustrates a PZT micro-actuator 1012 according to another exemplary embodiment of the present invention. In this embodiment, a notch 1088 is formed, e.g., by partial etching, in the bottom support 256 adjacent each coupling location with respective side arms 258, 259. In addition, a notch 1096 is formed, e.g., by partial etching, in each bridge 262, 264 adjacent the coupling location with respective side arms 258, 259 (only one notch 1096 being visible). As illustrated, the notch 1096 is formed on a front or inner surface of the bridges 262, 264 facing the slider 214 in use. The notches 1088 and 1096 help to reduce the coupling stiffness when the PZT micro-actuator 1012 is operated. The remaining components of the PZT micro-actuator 1012 are substantially similar to the PZT micro-actuator 212 and indicated with similar reference numerals. Although structurally different, the PZT micro-actuator 1012 has a substantially similar work principle as the PZT micro-actuator 212.

Figure 27:
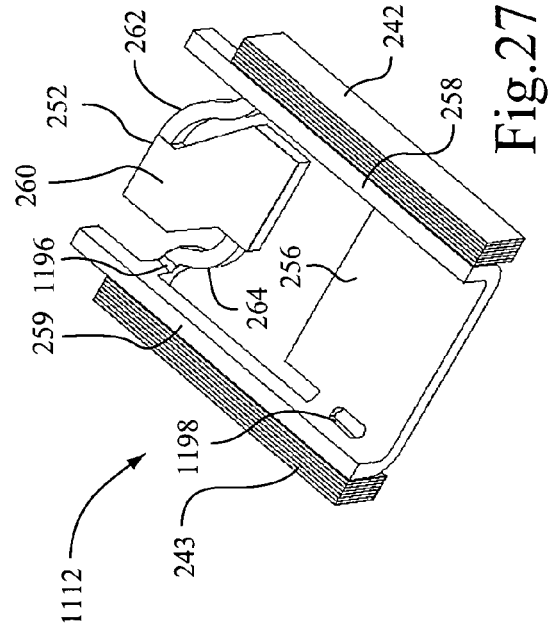
FIG. 27 is a top perspective view of a PZT micro-actuator according to still another embodiment of the present invention.

FIG. 27 illustrates a PZT micro-actuator 1112 according to another exemplary embodiment of the present invention. In this embodiment, a hole or opening 1198 is formed in the bottom support 256 adjacent each coupling location with respective side arms 258, 259 (only one hole 1198 being visible). In addition, a notch 1196 is formed, e.g., by partial etching, in each bridge 262, 264 adjacent the coupling location with respective side arms 258, 259 (only one notch 1196 being visible). As illustrated, the notch 1196 is formed on a front or inner surface of the bridges 262, 264 facing the slider 214 in use. The holes 1198 and notches 1196 help to reduce the coupling stiffness when the PZT micro-actuator 1112 is operated. The remaining components of the PZT micro-actuator 1112 are substantially similar to the PZT micro-actuator 212 and indicated with similar reference numerals. Although structurally different, the PZT micro-actuator 1112 has a substantially similar work principle as the PZT micro-actuator 212.

It should be understood that the holes and/or notches described above in FIGS. 22-27 may be provided to the frame 252 in any suitable combination. In addition, the holes and/or notches may have other suitable configurations to reduce the coupling stiffness when the PZT micro-actuator is operated.

Figure 28:
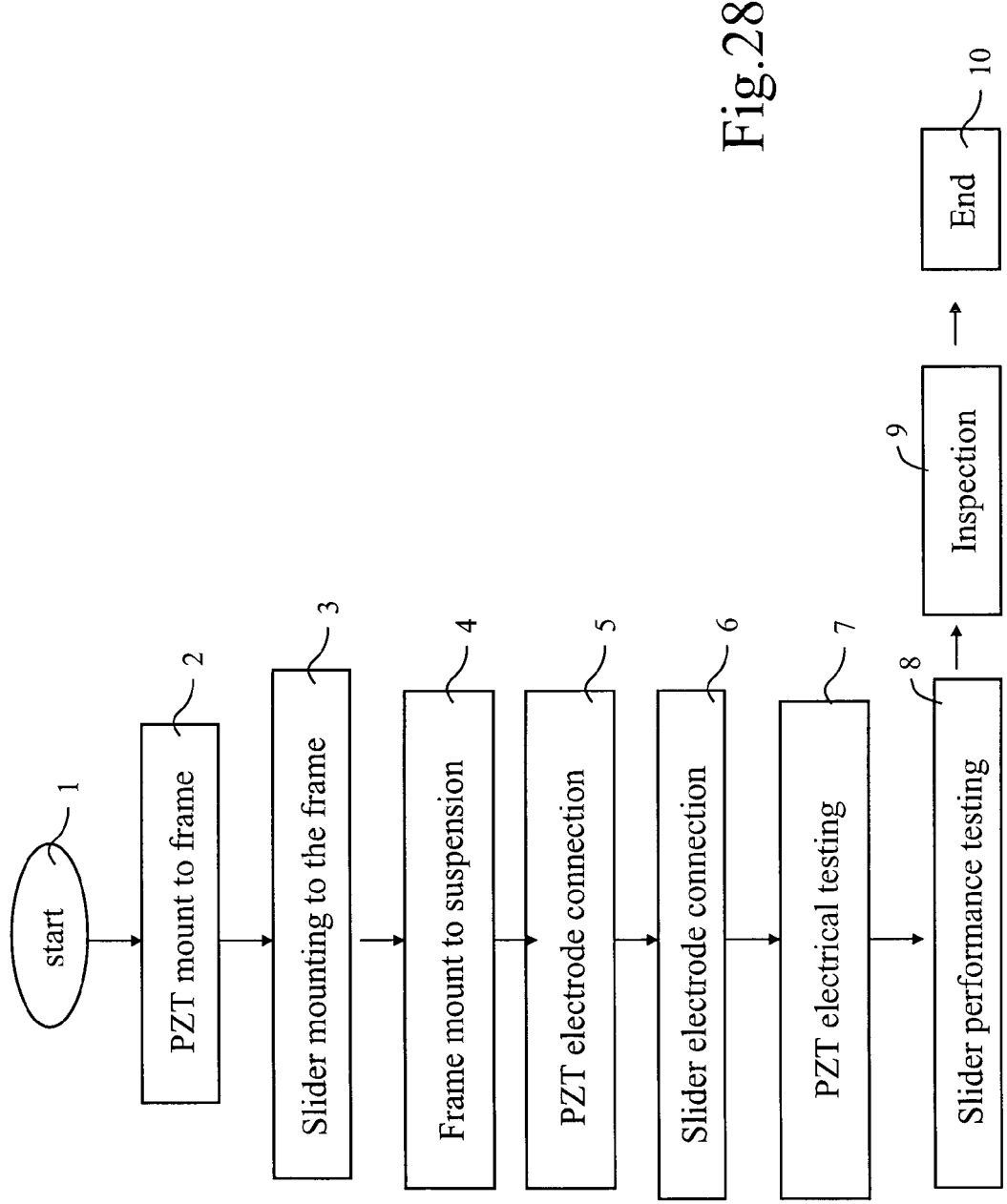
FIG. 28 is a flow chart illustrating a manufacturing and assembly process according to an embodiment of the present invention.

FIG. 28 illustrates the primary steps involved in the manufacturing and assembly process of a PZT micro-actuator according to an embodiment of the present invention. After the process starts (step 1 in FIG. 28), PZT elements are mounted to the micro-actuator frame (step 2 in FIG. 28). The frame and PZT elements may be structured such as those embodiments described above in FIGS. 8-27. Next, a slider is mounted to the micro-actuator frame (step 3 in FIG. 28). Then, the micro-actuator frame is mounted to the suspension of a HGA (step 4 in FIG. 28). The micro-actuator frame may be mounted to the suspension in a manner as described above in FIGS. 8-12. After that, the PZT elements and slider are electrically connected to the suspension (steps 5 and 6 in FIG. 28), and PZT electrical testing and slider performance testing is performed (steps 7 and 8 in FIG. 28). Finally, the assembly is inspected (step 9 in FIG. 28) to complete the manufacturing and assembly process (step 10 in FIG. 28).

FIG. 29 illustrates the primary steps involved in the manufacturing and assembly process of a PZT micro-actuator according to another embodiment of the present invention. After the process starts (step 1 in FIG. 29), PZT elements are mounted to the micro-actuator frame (step 2 in FIG. 29). The frame and PZT elements may be structured such as those embodiments described above in FIGS. 8-27. Next, the micro-actuator frame is mounted to the suspension of a HGA (step 3 in FIG. 29). The micro-actuator frame may be mounted to the suspension in a manner as described above in FIGS. 8-12. Then, the PZT elements are electrically connected to the suspension (step 4 in FIG. 29), and PZT electrical testing is performed (step 5 in FIG. 29). After that, a slider is mounted to the micro-actuator frame (step 6 in FIG. 29). The slider is electrically connected to the suspension (step 7 in FIG. 29), and slider performance testing is performed (step 8 in FIG. 29). Finally, the assembly is inspected (step 9 in FIG. 29) to complete the manufacturing and assembly process (step 10 in FIG. 29).

FIG. 30 illustrates the primary steps involved in the manufacturing and assembly process of a PZT micro-actuator according to another embodiment of the present invention. After the process starts (step 1 in FIG. 30), a micro-actuator frame is mounted to the suspension of a HGA (step 2 in FIG. 30). The micro-actuator frame may be structured and mounted to the suspension in a manner as described above in FIGS. 8-27. Then, PZT elements are mounted to the micro-actuator frame (step 3 in FIG. 30). The PZT elements may be structured such as those embodiments described above in FIGS. 8-27. Next, the PZT elements are electrically connected to the suspension (step 4 in FIG. 30), and PZT electrical testing is performed (step 5 in FIG. 30). After that, a slider is mounted to the micro-actuator frame (step 6 in FIG. 30). The slider is electrically connected to the suspension (step 7 in FIG. 30), and slider performance testing is performed (step 8 in FIG. 30). Finally, the assembly is inspected (step 9 in FIG. 30) to complete the manufacturing and assembly process (step 10 in FIG. 30).

A head gimbal assembly 210 incorporating a PZT micro-actuator 212, 312, 412, 512, 612. 712. 812, 912, 1012, 1112 according to embodiments of the present invention may be provided to a disk drive device (HDD). The HDD may be of the type described above in connection with FIG. 1. Because the structure, operation and assembly processes of disk drive devices are well known to persons of ordinary skill in the art, further details regarding the disk drive device are not provided herein so as not to obscure the invention. The PZT micro-actuator can be implemented in any suitable disk drive device having a micro-actuator or any other device with a micro-actuator. In an embodiment, the PZT micro-actuator is used in a high RPM disk drive device.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A head gimbal assembly comprising:
   a micro-actuator;
   a slider; and
   a suspension that supports the micro-actuator and the slider,
   the micro-actuator includes:
      a metal frame including
         a top support to support the slider,
         a bottom support to connect to the suspension, and
         a pair of side arms that interconnect the top support and the bottom support,
         the top support including a rotatable plate and connection arms that have a curved configuration and respectively extend from a top and bottom portion of the rotatable plate and couple to respective side arms; and
      a PZT element mounted to each of the side arms, wherein a first PZT element is excitable to cause a first side arm to bend towards a first direction, while a second PZT element is excitable to cause a second side arm to bend in a second direction opposite to the first direction,
   wherein the suspension includes a load beam having a dimple that engages and supports the rotatable plate in use.

2. The head gimbal assembly according to claim 1, wherein the connection arms are coupled with respective side arms in the same location along a longitudinal axis of the frame.

3. The head gimbal assembly according to claim 1, wherein the connection arms are coupled with the rotatable plate in mirror relation to a center of the rotatable plate.

4. The head gimbal assembly according to claim 1, wherein inner notches or spaces exist between the bottom support and respective side arms.

5. The head gimbal assembly according to claim 1, wherein each PZT element is a ceramic PZT, a thin-film PZT, or PMN-PT.

6. The head gimbal assembly according to claim 5, wherein each PZT element is single-layer or multi-layer.

7. The head gimbal assembly according to claim 1, wherein each PZT element includes bonding pads that are electrically connected to respective bonding pads provided on the suspension, and at least one of bonding pads of the suspension includes a ground part to ground the suspension.

8. The head gimbal assembly according to claim 1, wherein the rotatable plate includes a step to support the slider so that the slider does not engage the connection arms in use.

9. The head gimbal assembly according to claim 8, wherein the step is constructed of a polymer laminate, epoxy layer, or metal layer.

10. The head gimbal assembly according to claim 1, wherein a center of the slider, the rotatable plate, and the dimple are aligned along a common axis.

11. The head gimbal assembly according to claim 1, wherein the frame includes a rigid material or block mounted between the side arms at an end opposite the top support.

12. The head gimbal assembly according to claim 1, wherein the frame includes arm members provided to respective side arms adjacent the bottom support.

13. The head gimbal assembly according to claim 12, wherein the arm members are bent towards the bottom support.

14. The head gimbal assembly according to claim 12, wherein the arm members extend towards one another and in generally parallel relation to the bottom support.

15. The head gimbal assembly according to claim 1, wherein each of the connection arms includes a notch adjacent a coupling location with the respective side arm.

16. The head gimbal assembly according to claim 15, wherein the notch is formed on a front surface of the connection arms facing the slider in use.

17. The head gimbal assembly according to claim 15, wherein the notch is formed on a back surface of the connection arms facing away from the slider in use.

18. The head gimbal assembly according to claim 1, wherein the bottom support includes a hole adjacent each coupling location with the side arms.

19. The head gimbal assembly according to claim 18, wherein each of the connection arms includes a notch adjacent a coupling location with the respective side arm.

20. The head gimbal assembly according to claim 1, wherein the bottom support includes a notch adjacent each coupling location with the side arms.

21. The head gimbal assembly according to claim 20, wherein each of the connection arms includes a notch adjacent a coupling location with the respective side arm.

22. A disk drive device comprising:
   a head gimbal assembly including a micro-actuator, a slider, and a suspension that supports the micro-actuator and slider;
   a drive arm connected to the head gimbal assembly;
   a disk; and
   a spindle motor operable to spin the disk,
   the micro-actuator includes:
      a metal frame including
         a top support to support the slider,
         a bottom support to connect to the suspension, and
         a pair of side arms that interconnect the top support and the bottom support,
         the top support including a rotatable plate and connection arms that have a curved configuration and respectively extend from a top and bottom portion of the rotatable plate and couple to respective side arms; and
      a PZT element mounted to each of the side arms, wherein a first PZT element is excitable to cause a first side arm to bend towards a first direction, while a second PZT element is excitable to cause a second side arm to bend in a second direction opposite to the first direction, wherein the suspension includes a load beam having a dimple that engages and supports the rotatable plate in use.

23. A micro-actuator for a head gimbal assembly, comprising:
  a metal frame including
    a top support to adapted to support a slider,
    a bottom support adapted to be connected to a suspension,
    a pair of side arms that interconnect the top support and the bottom support, and
    arm members provided to respective side arms adjacent the bottom support,
    the top support including a rotatable plate and connection arms that have a curved configuration and respectively extend from a top and bottom portion of the rotatable plate and couple to respective side arms; and
  a PZT element mounted to each of the side arms, wherein a first PZT element is being excitable to cause a first side arm to bend toward a first direction, while a second PZT element is excitable to cause a second side arm to bend in a second direction opposite to the first direction.

24. The micro-actuator according to claim 23, wherein the arm members are bent towards the bottom support.

25. The micro-actuator according to claim 23, wherein the arm members extend towards one another and in generally parallel relation to the bottom support.

26. A micro-actuator for a head gimbal assembly, comprising:
  a metal frame including
    a top support to adapted to support a slider,
    a bottom support adapted to be connected to a suspension, and
    a pair of side arms that interconnect the top support and the bottom support,
    the top support including a rotatable plate and connection arms that have a curved configuration and respectively extend from a top and bottom portion of the rotatable plate and couple to respective side arms; and
  a PZT element mounted to each of the side arms, wherein a first PZT element is excitable to cause a first side arm to bend towards a first direction, while a second PZT element is excitable to cause a second side arm to bend in a second direction opposite to the first direction,
  wherein each of the connection arms includes a notch adjacent a coupling location with the respective side arm.

27. The micro-actuator according to claim 26, wherein the notch is formed on a front surface of the connection arms facing the slider in use.

28. The micro-actuator according to claim 26, wherein the notch is formed on a back surface of the connection arms facing away from the slider in use.

29. The micro-actuator according to claim 26, wherein the bottom support includes a hole adjacent each coupling location with the side arms.

30. The micro-actuator according to claim 26, wherein the bottom support includes a notch adjacent each coupling location with the side arms.

* * * * *